(12) United States Patent
Ezick et al.

(10) Patent No.: US 11,899,740 B2
(45) Date of Patent: *Feb. 13, 2024

(54) SYSTEMS AND METHODS FOR SOLVING UNRESTRICTED INCREMENTAL CONSTRAINT PROBLEMS

(71) Applicant: QUALCOMM Incorporated, San Diego, CA (US)

(72) Inventors: James Ezick, Canonsburg, PA (US); Thomas Henretty, Brooklyn, NY (US); Chanseok Oh, Fort Lee, NJ (US); Jonathan Springer, Carbondale, IL (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/113,814

(22) Filed: Dec. 7, 2020

(65) Prior Publication Data

US 2021/0334331 A1 Oct. 28, 2021

Related U.S. Application Data

(63) Continuation of application No. 14/854,825, filed on Sep. 15, 2015, now Pat. No. 10,860,945, which is a (Continued)

(51) Int. Cl.
*G06F 17/11* (2006.01)
*G06N 5/022* (2023.01)
(Continued)

(52) U.S. Cl.
CPC ............... *G06F 17/11* (2013.01); *G06F 9/54* (2013.01); *G06N 5/022* (2013.01); *G06N 7/00* (2013.01); *G06N 7/01* (2023.01); *G06N 20/00* (2019.01)

(58) Field of Classification Search
CPC ........... G06F 16/11; G06F 9/54; G06N 20/00; G06N 5/022; G06N 7/00; G06N 7/005
See application file for complete search history.

(56) References Cited

U.S. PATENT DOCUMENTS 7,406,592 B1   7/2008   Polyudov
10,402,747 B2   9/2019   Ezick et al.
(Continued)

OTHER PUBLICATIONS

Audemard G., et al., "Predicting Learnt Clauses Quality in Modern SAT Solvers", ANR UNLOC, 6 Pages, 2007.
(Continued)

*Primary Examiner* — Kevin W Figueroa
(74) *Attorney, Agent, or Firm* — QUALCOMM Incorporated

(57) ABSTRACT

We present the architecture of a high-performance constraint solver R-Solve that extends the gains made in SAT performance over the past fifteen years on static decision problems to problems that require on-the-fly adaptation, solution space exploration and optimization. R-Solve facilitates collaborative parallel solving and provides an efficient system for unrestricted incremental solving via Smart Repair. R-Solve can address problems in dynamic planning and constrained optimization involving complex logical and arithmetic constraints.

21 Claims, 9 Drawing Sheets

Related U.S. Application Data continuation of application No. 14/729,722, filed on Jun. 3, 2015, now Pat. No. 10,402,747.

(60) Provisional application No. 62/007,207, filed on Jun. 3, 2014.

(51) Int. Cl.
*G06N 7/00* (2023.01)
*G06N 20/00* (2019.01)
*G06N 7/01* (2023.01)
*G06F 9/54* (2006.01)

(56) References Cited

U.S. PATENT DOCUMENTS

| | | | |
|---|---|---|---|
| 10,860,945 B2 | 12/2020 | Ezick et al. | |
| 2003/0225552 A1 | 12/2003 | Ganai et al. | |
| 2008/0120490 A1 | 5/2008 | Brown | |
| 2010/0057647 A1* | 3/2010 | Davis | G06N 5/04 706/12 |
| 2010/0063947 A1* | 3/2010 | Burnside | G16H 10/60 705/3 |
| 2010/0293127 A1 | 11/2010 | Hamadi et al. | |
| 2012/0266133 A1* | 10/2012 | Imai | G06F 8/313 717/114 |
| 2015/0379404 A1 | 12/2015 | Ezick et al. | |
| 2016/0034825 A1 | 2/2016 | Ezick et al. | |

OTHER PUBLICATIONS

Davies J., et al., "Using More Reasoning to Improve #SAT Solving", Association for the Advancement of Artificial Intelligence, 6 Pages, 2007.
Een N., et al., "Effective Preprocessing in SAT through Variable and Clause Elimination", 16 Pages, 2005.
Een N., et al., "Temporal Induction by Incremental SAT Solving", 16 Pages, 2003.
Ezick: "Salt: An Application Logic and Translation Tool for SAT", 6 Pages, 2014.
Hamadi Y., et al., "Seven Challenges in Parallel SAT Solving", Association for the Advancement of Artificial Intelligence, 7 Pages, 2012.
Lewis M., et al., "PaQuBE: Distributed QBF Solving with Advanced Knowledge Sharing", International Conference on Theory and Applications of Satisfiability Testing, Springer, Berlin, Heidelberg, 2009, 14 Pages.
Malik S., et al., "Boolean Satisfiability from Theoretical Hardness to Practical Success", Communication of the ACM, vol. 52, No. 8, 7 Pages, 2009.
Moskewicz M.W., et al., "Chaff: Engineering an Efficient SAT Solver", 6 Pages, 2001.
Sebastiani R., "Lazy Satisfiability Modulo Theories", Journal on Satisfiability, Boolean Modeling and Computation, vol. 3, 84 Pages, 2007.
Singer D., "Parallel Resolution of the Satisfiability Problem: A Survey", 30 Pages, 2007.
Sinz C., et al., "PaSAT—Parallel Sat-Checking with Lemma Exchange: Implementation and Applications", 6 Pages, 2001.
Tseitin G.S., "On the Complexity of Derivation in Propositional Calculus", 11 Pages.
Whittemore J., et al., "Satire: A New Incremental Satisfiability Engine", DAC, 4 Pages, 2001.
Wieringa S., et al., "Asynchronous Multi-Core Incremental SAT Solving", 16 Pages, 2013.
Xu L., et al., "SATzilla: Portfolio-based Algorithm Selection for SAT", Journal of Artificial Intelligence Research, vol. 32, 42 Pages, 2008.
Zhang H., et al., "Psato: A Distributed Propositional Prover and its Application to Quasigroup Problems," J. Symbolic Computation, vol. 21, 18 Pages, 1996.
Zhang L., et al., "Conflict Driven Learning in a Quantified Boolean Satisfiability Solver", Proceedings of the 2002 IEEE/ACM International Conference on Computer-Aided Design, ACM, 8 Pages, 2002.
Zhang L., et al., "Efficient Conflict Driven Learning in a Boolean Satisfiability Solver", 7 Pages, 2001.
Mahajan Y.S., et al., "Zchaff2004: An Efficient SAT Solver", International Conference on Theory and Applications of Satisfiability Testing, LNCS, 2005, pp. 360-375 (Year 2004).

* cited by examiner

```
union {
    struct {
        uint32_t fst : 6;
        uint32_t snd : 26;
    };
    uint32_t val;
};
```

FIG. 3

```
bool rid_failed = false;
while (true) {
    MESSAGE msg = stub.next_message();
    if (msg == TERMINATE_WORLD) {
        . . .
    } else if (msg == CLEAR_PROBLEM) {
        rid_failed = false;
        // Destroy the current solver and create another.
        . . .
        stub.reset(); // This will reset the IDGen() counter.
    } else if (msg == INVALID_CLAUSES) {
        . . .
    } else if (msg == RESTORED_CLAUSES) {
        . . .
    } else if (msg == NEW_CLAUSES) {
        . . .
    } else if (msg == START_SOLVING) {
        . . .
        try {
            if (rid_failed) { // Ignore the command if rid_failed.
            throw RID_EXHAUSTED();
            }
            . . .
            start_solver(); // Can throw RID_EXHAUSTED.
            . . .
        } catch (RID_EXHAUSTED&) {
            rid_failed = true;
            stub.report_RID_FAIL();
        }
    } else if (msg == SHARED_CLAUSES) {
        . . .
        if (! rid_failed) { // Process the clauses only if (! rid_failed).
            . . .
        }
    }
}
```

FIG. 4

FIG. 5(C)
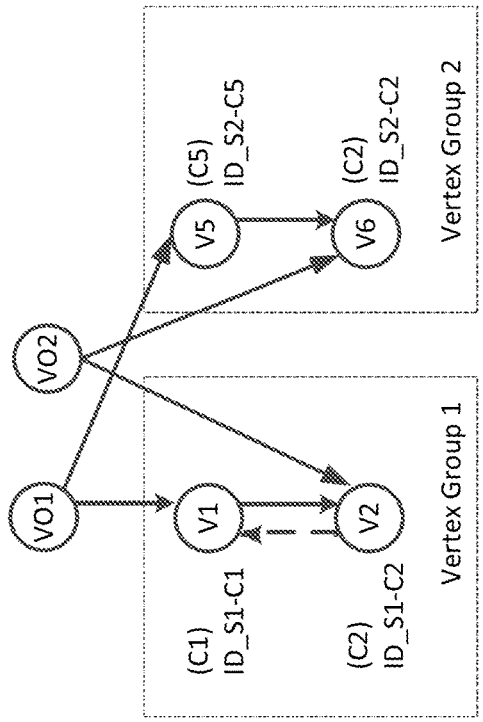
FIG. 5(F)
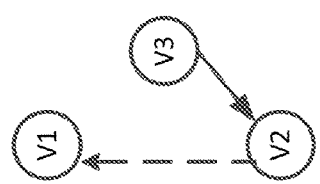
FIG. 5(B)
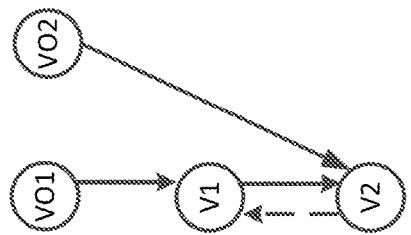
FIG. 5(E)
FIG. 5(A)
FIG. 5(D)

```
while (true) {
    MESSAGE msg = stub.next_message(sleep_ms);
    if (msg == TERMINATE_WORLD) { . . . . }
    else if (msg == CLEAR_PROBLEM) { . . . . }
    else if (msg == INVALID_CLAUSES) { . . . . }
    else if (msg == RESTORED_CLAUSES) { . . . . }
    else if (msg == NEW_CLAUSES) { . . . . }
    else if (msg == START_SOLVING) { . . . . }
    // This message can get delivered even after all solvers have stopped.
    else if (msg == SHARED_CLAUSES) {
        stub.receive_shared();
        solver.moderate();
        solver.add_shared_clauses();
    }
}
```

FIG. 6

SYSTEMS AND METHODS FOR SOLVING UNRESTRICTED INCREMENTAL CONSTRAINT PROBLEMS

This application is a continuation of U.S. patent application Ser. No. 14/854,825, entitled "Systems and Methods for Solving Unrestricted Incremental Constraint Problems," filed on Sep. 15, 2015, now U.S. Pat. No. 10,860,945, which is a continuation of U.S. patent application Ser. No. 14/729,722, entitled "Systems and Methods for Solving Unrestricted Incremental Constraint Problems," filed on Jun. 3, 2015, now U.S. Pat. No. 10,402,747, which claims priority to and the benefit of U.S. Provisional Patent Application No. 62/007,207, entitled "Systems and Methods for Unrestricted Incremental Constraint Solving," filed on Jun. 3, 2014, the entire contents of which are incorporated herein by reference in their entireties.

STATEMENT OF GOVERNMENT SUPPORT

This invention was made with government support under Contract No. W91CRB-11-C-0087 awarded by the Army Contracting Command Aberdeen Proving Ground/DARPA. The government has certain rights in the invention.

FIELD OF THE INVENTION

This disclosure generally relates to parallelized systems for solving optimization problems and, in particular to techniques for facilitating efficient parallelization of solving Boolean Satisfiability (SAT) problems.

BACKGROUND

Since 2000, the algorithmic performance of single-node sequential solvers for the Boolean Satisfiability (SAT) problem has improved by more than 1000×. While the SAT problem generally has worst-case NP-complete complexity, many structured problems do not exhibit such worst case complexity and modern solvers have evolved into highly successful tools for solving a range of practical problems including resource allocation, planning, and hardware and software verification. As a practical tool, SAT solvers fill a niche in that they can efficiently reason within a single framework about complex logical constraints that capture concepts such as coordination, deconfliction and mutual exclusion and fixed-point arithmetic constraints that can include non-linear expressions. As a practical tool, open off-the-shelf SAT solvers suffer from two key limitations.

First, each SAT problem instance input is inherently limited to a static SAT-or-UNSAT decision problem. A generic modern SAT solver, given a logical formula over a set of Boolean variables (typically a conjunction of constraints), will either return a result of SAT along with a single example assignment to the variables or else a result of UNSAT representing that the problem is unsolvable. If a second example SAT assignment is required or if the logical expression is modified, the solver must be restarted from the beginning with no retained information. While specialized solvers exist that can count the number of satisfying assignments or that provide a limited (addition of refinement constraints only) incremental solving capability, these solvers do not fully address this limitation in a practical sense and are not typically at the leading edge of performance.

Second, solvers at the leading edge of performance are aggressively optimized and notoriously difficult to either parallelize or extend. Many modern solvers accept logical expressions in Conjunctive Normal Form (CNF) and use custom data structures to access and manage clauses (disjunctions of literals) affected by a variable assignment. In addition, one of the key optimizations in modern SAT solving is to use a system for generating new learnt clauses that capture ground truths about the problem instance and concisely prune the search tree of possibly valid assignments. Although the propagation of logical implications, called Boolean Constraint Propagation (BCP), from test assignments can be parallelized in theory, the data structures and learning required to achieve top performance result in extreme non-locality of memory references and difficult synchronization requirements that have frustrated many attempts at effective fine-grained parallelism. Further, aggressive optimization tends to make the implementation fragile to modification or the addition of state to support extended features.

Some techniques describe management of an ensemble of solvers in which the solvers may communicate with each other in a peer-to-peer manner. Changes to the original problem to be solved may be communicated to the different solvers of the ensemble to facilitate incremental solving. In these techniques, however, the individual solvers typically cannot retrieve previously learned information that may still be valid after a modification of the problem and, as such, may need to regenerate such information or may need to solve the modified problem without such information. While the information about the solution to the problem may be shared, the solvers typically do not and cannot manage sharing of the information because, in general, no solver has a complete view of all of the information shared across the entire ensemble, whether previously shared information is valid after a change to the original problem.

SUMMARY

In various embodiments, we introduce an architecture for a fully unrestricted incremental SAT solver, R-Solve, that addresses both of the key limitations described above. R-Solve is an "extreme" SAT solver in that it combines the new technology of Smart Repair, which enables unrestricted incremental solving (unlimited addition or subtraction of constraints during or after the execution of the solver), with techniques in ensemble solving and clause sharing for MPI-connected clusters while retaining (modulo a manageable amount of communication overhead), i.e., the typical performance characteristics of a leading-edge open solver. In various embodiments, Smart Repair provides an API that can be applied to many of solvers including various open solvers. R-Solve can provide a platform for new applications of SAT, including optimization and dynamic replanning problems, and may open new frontiers for improving performance for practical problems on UPC platforms.

Accordingly, in one aspect, a method is provided for controlling using a controller an ensemble of a number of solvers. In various embodiments, the controller can be separate from each one of the several solvers. The method includes performing by the controller generating a master graph by creating a first vertex corresponding to a first clause, and associating the first vertex with a first solver of the number of solvers. Generating the master graph also includes adding a second vertex corresponding to a second clause, associating the second vertex with the first solver, and establishing an undo edge from the second vertex to the first vertex. The method also includes identifying, using the second vertex and the undo edge, a vertex corresponding to a clause to be restored, and transmitting a command to the first solver, where the command includes a signal to restore the clause to be restored. The command may further include a signal to invalidate the second clause. In some embodiments, the controller transmits the command while the first solver is running, while in other embodiments, the controller transmits the command when the first solver has stopped running, before the first solver starts running again. The vertex corresponding to the clause to be restored may include the first vertex, and the clause to be restored may therefore include the first clause.

In some embodiments, the second clause is a dummy clause, and the method further includes receiving from the first solver, prior to adding the second vertex, a message. The message may describe: (i) that the first solver identified a third clause, (ii) a relationship between the first clause and the third clause, and (ii) that the first solver removed the first clause from a data structure maintained by the first solver. Accordingly, the method may include adding a third vertex corresponding to the third clause, and associating the third vertex with the first solver, and forming a successor edge from the third vertex to the second vertex. The relationship may specifies one of: the third clause subsumes the first clause; the third clause satisfies the first clause; and the third clause implies that if the third clause is satisfied the second clause is also satisfied, even though the third clause is not derived from the first clause. The method may include, prior to transmitting the command to the first solver, identifying the third vertex for removal and, in response, identifying via the successor edge, the second vertex for removal.

In some embodiments, identifying the vertex corresponding to a clause to be restored includes: (i) identifying, using the undo edge, the first vertex, and (ii) identifying, using an undo edge from the first vertex, a fourth vertex. The fourth vertex may correspond to a fourth clause and may be associated with the first solver. The clause to be restored may include the fourth clause. The command may further include a signal to invalidate the first clause.

In some embodiments, the method further includes receiving from the first solver, prior to adding the second vertex, a first message. The first message may describe that the first solver at least in part learned the second clause from the first clause and removed the first clause from a data structure maintained by the first solver. The first message may also identify a first unique identifier associating the second clause described in the first message with the first solver. The method may include forming a successor edge from the first vertex to the second vertex.

The first clause may include a learned clause that is reachable from a first original clause corresponding to a first original vertex, and the method may further include selecting a second original vertex corresponding to a second original clause for temporary invalidation. The second original vertex is selected such that: (i) the first clause was not derived from the second original clause, and (ii) the second clause is reachable from both the second original clause and the first clause. The method may also include determining by the controller, prior to the transmitting step, that the second clause is invalid.

The first clause may include a learned clause reachable from a first original clause corresponding to a first original vertex, and the method may further include receiving a second message from a second solver of the several solvers. The second message may describe that the second solver at least in part learned: (i) a fifth clause from the first original clause, and (ii) the second clause from both the second original clause and the fifth clause, and retained the fifth clause from a data structure maintained by the second solver. The message may also identify a second unique identifier associating the second clause described in the second message with the second solver. The method may additionally include creating a fifth vertex corresponding to the fifth clause, and associating the fifth vertex with the second solver. The method may further include adding a sixth vertex corresponding to the second clause described in the second message, and associating the sixth vertex with the second solver using the second unique identifier. Finally, the method may include forming a successor edge from the fifth vertex to the sixth vertex without adding an undo edge from the sixth vertex to the fifth vertex. Thus, in the master graph, an undo edge is associated with the second clause with respect to the first solver but not with respect to the second solver.

In another aspect, a system for controlling an ensemble having a number of solvers includes a first processor and a first memory in electrical communication with the first processor. The first memory includes instructions which, when executed by a processing unit that may include the first processor and/or a second processor and that is coupled to a memory module including either the first memory or a second memory, or both, program the processing unit as a controller, to generate a master graph by creating a first vertex corresponding to a first clause, and associating the first vertex with a first solver of the number of solvers. The instructions also program the processing unit to add a second vertex corresponding to a second clause, to associate the second vertex with the first solver, and to establish an undo edge from the second vertex to the first vertex. The instructions further program the processing unit to identify, using the second vertex and the undo edge, a vertex corresponding to a clause to be restored, and to transmit a command to the first solver where the command includes a signal to restore the clause to be restored. The command may further include a signal to invalidate the second clause. In various embodiments, the instructions can program the processing unit to perform one or more of the method steps described above. The system may include several solvers, where each solver is separate from the controller.

In another aspect, an article of manufacture that includes a non-transitory storage medium has stored therein instructions which, when executed by a processing unit program the processing unit, which is in electronic communication with a memory module, as a controller to control an ensemble of a number of solvers. The instructions program the processing unit to generate a master graph by creating a first vertex corresponding to a first clause, and associating the first vertex with a first solver of the number of solvers. The instructions also program the processing unit to add a second vertex corresponding to a second clause, to associate the second vertex with the first solver, and to establish an undo edge from the second vertex to the first vertex. The instructions further program the processing unit to identify, using the second vertex and the undo edge, a vertex corresponding to a clause to be restored, and to transmit a command to the first solver where the command includes a signal to restore the clause to be restored. The command may further include a signal to invalidate the second clause. In various embodiments, the instructions can program the processing unit to perform one or more of the method steps described above.

In another aspect, a method is provided for controlling using a controller an ensemble of a number of solvers. In various embodiments, the controller can be separate from each one of the several solvers. The method includes performing by the controller pruning a master graph, where the master graph includes a number of original vertices, each original vertex corresponding to a respective original clause. The master graph also includes a number of vertex groups, where each vertex group is associated with a respective solver from the several solvers. The method also includes generating one or more pruning messages, where each pruning message corresponds to a respective one of the several solvers, and transmitting to one or more of the several solvers, the corresponding pruning message.

Each vertex group may include a number of non-original vertices. Each non-original vertex may: (i) correspond to a respective clause learned by a solver associated with the vertex group, and (ii) be reachable from at least one of the original vertices. Pruning the master graph may include selecting one or more original clauses and identifying one or more original vertices corresponding to the selected one or more original clauses and, within each vertex group, marking, e.g., for removal, all non-original vertices that are reachable from the one or more identified original vertices. Pruning may also include collecting identifiers of learned clauses corresponding to the marked non-original vertices, and removing the marked non-original vertices.

Generating a pruning message corresponding to a particular solver may include selecting the vertex group corresponding to that particular solver, and listing in the pruning message the collected identifiers of the learned clauses as identifiers of clauses to be removed. A particular vertex group may include an undo edge originating from a first non-original vertex. Accordingly, in some embodiments, the method further includes identifying a destination vertex that is both reachable via the undo edge and that is not marked, and listing in the pruning message a learned clause associated with the destination vertex as a clause to be restored. In some embodiments, the undo edge originating from the first non-original vertex terminates at a second vertex, and the destination vertex comprises the second vertex. In other embodiments, the undo edge originating from the first non-original vertex terminates at a second vertex, another undo edge originating from the second vertex terminates at a third vertex, and the destination vertex comprises the third vertex or a vertex reachable from the third vertex. In general, a chain of any number (e.g., 1, 2, 3, 5, 8, 20, 45, 85, or more) of vertices may be formed via respective undo edges starting from the first non-original vertex, finally terminating at the destination vertex. All the vertices in the chain except for the destination vertex may be marked for removal.

In some embodiments, selecting one or more original clauses (for graph reduction) includes a random selection. Selecting one or more original clauses (for graph reduction) may also include a score-based selection. To this end, the method may include computing a score for each original clause using, e.g., the number of literals in the clause, the number of vertices reachable from a vertex corresponding to the original clause, etc. In some embodiments, the method includes, prior to transmitting the one or more pruning messages, determining that the ensemble has stopped. The pruning message corresponding to one or more solvers may be transmitted prior to restart of the ensemble.

In another aspect, a system for controlling an ensemble having a number of solvers includes a first processor and a first memory in electrical communication with the first processor. The first memory includes instructions which, when executed by a processing unit that may include the first processor and/or a second processor and that is coupled to a memory module including either the first memory or a second memory, or both, program the processing unit as a controller, to prune a master graph, where the master graph includes a number of original vertices, each original vertex corresponding to a respective original clause. The master graph also includes a number of vertex groups, where each vertex group is associated with a respective solver from the several solvers. The instructions also program the processing unit to generate one or more pruning messages, where each pruning message corresponds to a respective one of the several solvers, and to transmit to one or more of the several solvers, the corresponding pruning message. In various embodiments, the instructions can program the processing unit to perform one or more of the method steps described above. The system may include several solvers, where each solver is separate from the controller.

In another aspect, an article of manufacture that includes a non-transitory storage medium has stored therein instructions which, when executed by a processing unit program the processing unit, which is in electronic communication with a memory module, as a controller to control an ensemble of a number of solvers. The instructions program the processing unit to prune a master graph, where the master graph includes a number of original vertices, each original vertex corresponding to a respective original clause. The master graph also includes a number of vertex groups, where each vertex group is associated with a respective solver from the several solvers. The instructions also program the processing unit to generate one or more pruning messages, where each pruning message corresponds to a respective one of the several solvers, and to transmit to one or more of the several solvers, the corresponding pruning message. In various embodiments, the instructions can program the processing unit to perform one or more of the method steps described above.

In another aspect, a method for sharing clauses by a sharing module across an ensemble of a number of solvers is provided. The method includes performing by the sharing module, receiving from a first solver a first message including: (i) a first clause to be shared, and (ii) a first identifier corresponding to the first clause and associating the first clause with the first solver. The method also includes determining that a second solver: (i) has not learned the first clause, and that (ii) the first clause corresponding to the first identifier was not transmitted to the second solver. In addition, the method includes transmitting the first clause and the corresponding first identifier to the second solver, and updating a database indicating that the first clause corresponding to the first identifier was transmitted to the second solver. Determining that the second solver has not learned the first clause may include using a hash-based comparison of the first clause and each clause learned by the second solver. In some embodiments, the sharing module is separate from each one of the several of solvers.

In some embodiments, the method further includes determining that a third solver: (i) has not learned the first clause, and that (ii) the first clause corresponding to the first identifier was not transmitted to the third solver, as well. As such, the method may include transmitting the first clause and the corresponding first identifier to the third solver, and updating the database further, indicating that the first clause corresponding to the first identifier was also transmitted to the third solver. In some embodiments, the method includes determining that the first clause corresponding to the first identifier was invalidated, and transmitting a message to the second solver, informing the second solver that the first clause corresponding to the first identifier is invalidated.

The method may include determining, after updating the database, that the second solver: (i) has learned a particular clause, and (ii) has assigned a second identifier corresponding to the particular clause and associating the particular clause with the second solver. As such, in some embodiments, the method includes determining that the particular clause corresponding to the second identifier is same as the first clause corresponding to the first identifier, and transmitting a second message to the second solver, informing the second solver that the first identifier corresponding to the first clause is invalidated, because the second solver now has the first clause associated with the second identifier.

In some embodiments, the method includes receiving from the second solver, after updating the database, a second message that includes: (i) a particular clause to be shared, and (ii) a second identifier corresponding to the particular clause and associating the particular clause with the second solver. The method may include determining that the particular clause corresponding to the second identifier is same as the first clause corresponding to the first identifier, and determining that the particular clause is therefore not be transmitted to the first solver.

The method may also include receiving from a third solver a third message including: (i) a particular clause to be shared, and (ii) a third identifier corresponding to the particular clause and associating the particular clause with the third solver. The third message may be received prior to transmitting the first clause corresponding to the first identifier to the second solver. The method may further include determining that the particular clause corresponding to the third identifier is same as the first clause corresponding to the first identifier. As such, the method may include determining that the particular clause is not be transmitted to the first solver and the second solver, and determining that the first clause corresponding to the first identifier is not to be transmitted to the third solver. In some embodiments, the method includes determining, after transmitting the first clause and the corresponding first identifier to the second solver, that the first clause corresponding to the first identifier was invalidated. As such, the method may include transmitting the particular clause and the corresponding third identifier to the first solver, and updating the database indicating that the particular clause corresponding to the third identifier was transmitted to the first solver.

In some embodiments, the method includes determining that the particular clause corresponding to the third identifier is different from the first clause corresponding to the first identifier. Accordingly, the method may include testing whether the particular clause is to be transmitted to the first solver and the second solver, and testing whether the first clause corresponding to the first identifier is to be transmitted to the third solver. The method may further include transmitting the particular clause and the corresponding third identifier to the first solver and/or the second solver. Alternatively or in addition, the method may include transmitting the first clause and the corresponding first identifier to the third solver.

In another aspect, a system for sharing clauses, via a sharing module, across an ensemble having a number of solvers includes a first processor and a first memory in electrical communication with the first processor. The first memory includes instructions which, when executed by a processing unit that may include the first processor and/or a second processor and that is coupled to a memory module including either the first memory or a second memory, or both, program the processing unit as a sharing module, to receive from a first solver a first message including: (i) a first clause to be shared, and (ii) a first identifier corresponding to the first clause and associating the first clause with the first solver. The instructions also program the processing unit to determine that a second solver: (i) has not learned the first clause, and that (ii) the first clause corresponding to the first identifier was not transmitted to the second solver. In addition, the instructions program the processing unit to transmit the first clause and the corresponding first identifier to the second solver, and to update a database indicating that the first clause corresponding to the first identifier was transmitted to the second solver. In various embodiments, the instructions can program the processing unit to perform one or more of the method steps described above. The system may include several solvers, where each solver is separate from the sharing module.

In another aspect, an article of manufacture that includes a non-transitory storage medium has stored therein instructions which, when executed by a processing unit program the processing unit, which is in electronic communication with a memory module, as a sharing module to share clauses across an ensemble of a number of solvers. The instructions program the processing unit to receive from a first solver a first message including: (i) a first clause to be shared, and (ii) a first identifier corresponding to the first clause and associating the first clause with the first solver. The instructions also program the processing unit to determine that a second solver: (i) has not learned the first clause, and that (ii) the first clause corresponding to the first identifier was not transmitted to the second solver. In addition, the instructions program the processing unit to transmit the first clause and the corresponding first identifier to the second solver, and to update a database indicating that the first clause corresponding to the first identifier was transmitted to the second solver. In various embodiments, the instructions can program the processing unit to perform one or more of the method steps described above.

In another aspect, a method is provided for sharing clauses across an ensemble of several solvers. The method includes performing by a sharing module receiving from a first solver a first message including: (i) a first clause designated sharable by the first solver, (ii) a score designated to the first clause by the first solver; and (iii) a first identifier corresponding to the first clause and associating the first clause with the first solver. The method also includes analyzing: (i) a characteristic of the first clause, or (ii) the designated score, or both, to determine if the first clause is to be shared.

Analyzing the characteristic may include determining if a number of literals in the first clause is at most equal to a first limit on number of literals. Alternatively or in addition, analyzing the characteristic may include determining if a number of literals in the first clause is at least equal to a second limit on number of literals. Thus, only the clauses having less than or equal to a specified number of literals (e.g., 1, 2, 3, etc.) may be shared even if a solver designated a clause having more literals as sharable. In some embodiments, the clauses having more than or equal to a specified number of literals (e.g., 3, 4, 5, etc.) may not be shared even if a solver designated such a clause as sharable. In some embodiments, analyzing the score includes determining if the score is at least equal to a score threshold.

In some embodiments, the method includes determining that a second solver: (i) has not learned the first clause, and that (ii) the first clause corresponding to the first identifier was not transmitted to the second solver. The method may also include transmitting the first clause and the corresponding first identifier to the second solver, and updating a database indicating that the first clause corresponding to the first identifier was transmitted to the second solver. Thus, the first clause is shared by the sharing module with the second solver after the sharing module decided that the first clause was sharable.

In another aspect, a system for sharing clauses, via a sharing module, across an ensemble having a number of solvers includes a first processor and a first memory in electrical communication with the first processor. The first memory includes instructions which, when executed by a processing unit that may include the first processor and/or a second processor and that is coupled to a memory module including either the first memory or a second memory, or both, program the processing unit as a sharing module, to receive from a first solver a first message including: (i) a first clause designated sharable by the first solver, (ii) a score designated to the first clause by the first solver; and (iii) a first identifier corresponding to the first clause and associating the first clause with the first solver. The instructions also program the processing unit to analyze: (i) a characteristic of the first clause, or (ii) the designated score, or both, to determine if the first clause is to be shared. In various embodiments, the instructions can program the processing unit to perform one or more of the method steps described above. The system may include several solvers, where each solver is separate from the sharing module.

In another aspect, an article of manufacture that includes a non-transitory storage medium has stored therein instructions which, when executed by a processing unit program the processing unit, which is in electronic communication with a memory module, as a sharing module to share clauses across an ensemble of a number of solvers. The instructions program the processing unit to receive from a first solver a first message including: (i) a first clause designated sharable by the first solver, (ii) a score designated to the first clause by the first solver; and (iii) a first identifier corresponding to the first clause and associating the first clause with the first solver. The instructions also program the processing unit to analyze: (i) a characteristic of the first clause, or (ii) the designated score, or both, to determine if the first clause is to be shared. In various embodiments, the instructions can program the processing unit to perform one or more of the method steps described above.

In another aspect, a method for facilitating communication between a solver and a controller includes integrating an application program interface (API) with a solver. The API includes a first transmit function to notify the controller, by the solver, a clause learned by the solver and one or more antecedent clauses of the learned clause. The API also includes a receive function to receive from the controller: (i) one or more clauses to be added to a solver database, and/or (ii) one or more clauses to be removed from the solver database. The first transmit function may be further configured to notify the controller, by the solver, another clause modified by the learned clause. In some embodiments, the method includes invoking the first transmit function by the solver when a learnt clauses buffer reaches a limit on the number of learnt clauses. Thus, the solver can transmit several learnt clauses and, optionally, one or more antecedent clauses of each learnt clause, to the controller. The controller/master may include a sharing module.

In some embodiments, the method includes processing by the solver one or more received clauses while the solver is running. Thus, the controller can inform the solver of a change to the problem to be solved, where the change is described in terms of one or more clauses that are added and/or one or more clauses that are removed. In some embodiments, the method includes processing by the solver one or more received clauses after the solver has stopped running, before the solver starts running again. Thus, the controller can perform reduction of a master graph (e.g., for performance improvement, memory management, etc.) and the inform the solver how to prune the solver's individual graph after the reduction of the master graph.

In some embodiments, the API includes a second transmit function to notify to the controller a clause to be shared by the controller with one or more other solvers. The method may include invoking the second transmit function by the solver when a sharable clauses buffer reaches a limit on the number of clauses to be shared. Thus, the solver may inform the sharing module several sharable clauses.

In another aspect, an interface system for facilitating communication between a solver and a controller includes a memory module having instructions stored thereon which, when executed by a processing unit configured as a solver provide an application program interface (API) to the solver. The API includes a first transmit function, invokable by the solver, to notify the controller, by the solver, a clause learned by the solver and one or more antecedent clauses of the learned clause. The API also includes a receive function to receive from the controller: (i) one or more clauses to be added to a solver database, and/or (ii) one or more clauses to be removed from the solver database. In various embodiments, the instructions can program the processing unit to perform one or more of the method steps described above.

In another aspect, an article of manufacture that includes a non-transitory storage medium has stored therein instructions which, when executed by a processing unit implementing a solver, provide an application program interface (API) to the solver. The API includes a first transmit function, invokable by the solver, to notify the controller, by the solver, a clause learned by the solver and one or more antecedent clauses of the learned clause. The API also includes a receive function to receive from the controller: (i) one or more clauses to be added to a solver database, and/or (ii) one or more clauses to be removed from the solver database. In various embodiments, the instructions can program the processing unit to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which:

FIG. 3 depicts an example structure of unique identifiers corresponding to clauses, according to one embodiment;

FIG. 4 depicts an example of a polling loop of a solver, according to one embodiment;

FIGS. 5(A)-5(F) schematically depict at least partial master graphs, according to various embodiments;

FIG. 6 schematically depicts processing of received messages by a solver, according to one embodiment.

DETAILED DESCRIPTION

Figure 1:
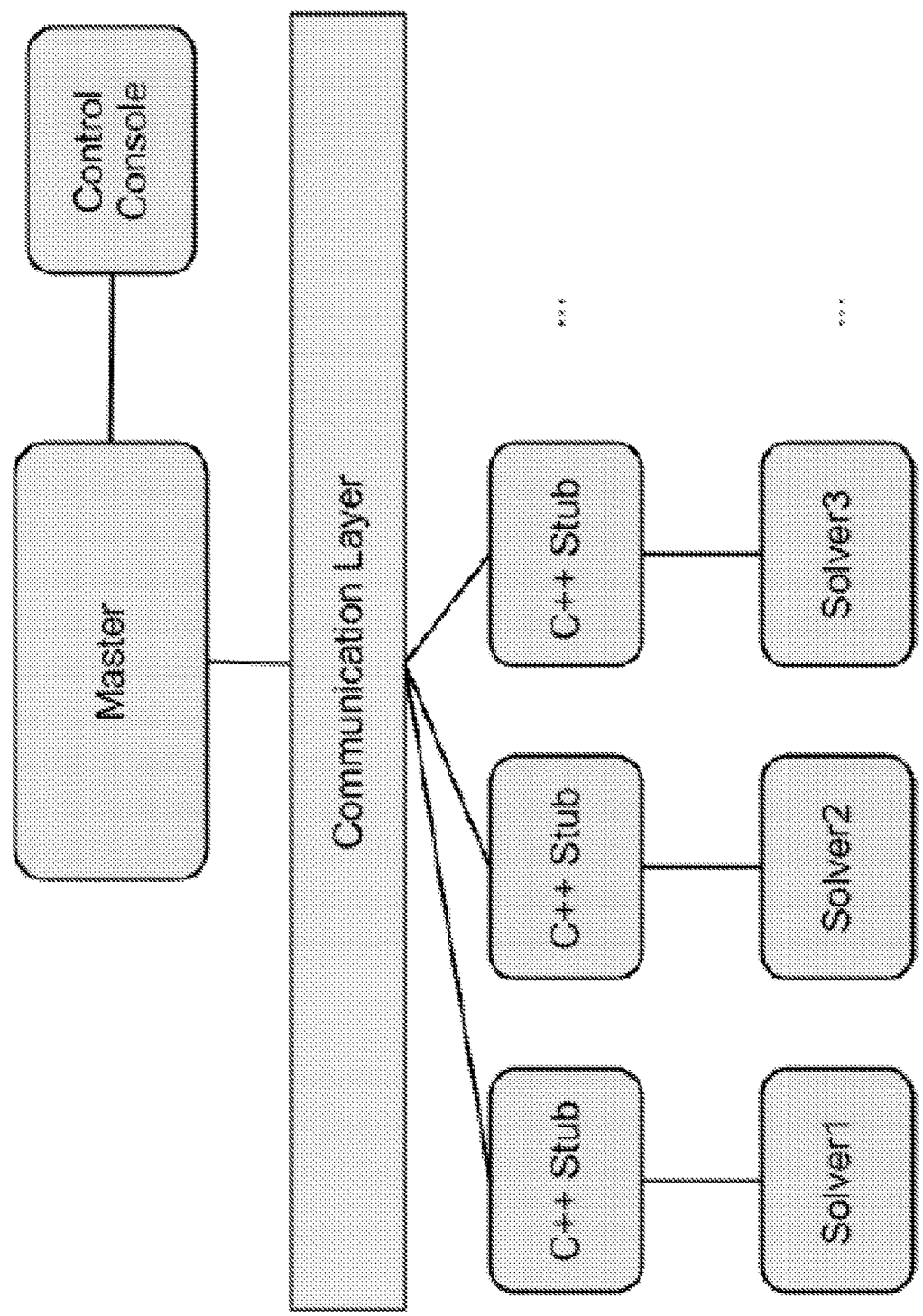
FIG. 1 schematically depicts a master and an ensemble of solvers, according to one embodiment.

Smart Repair is an extension to the dominantly used Conflict-Directed Clause Learning (CDCL) method of SAT solving enabling efficient unrestricted incremental solving through the discrimination and retention of unaffected learned information across a modification of the formula.

Foundations of Modern CDCL SAT Solving. The baseline CDCL algorithm assumes a problem formula presented in CNF as a set of original clauses and executes according to the following high-level loop:
1. An unassigned variable is chosen for assignment (decision assignment: true or false). The logical implications of that assignment are discovered through BCP.
2. These implications become additional assignments which are then also propagated serially using a work queue.
3. The process terminates when either (1) all variables are assigned (problem is solved), (2) there are no more assignments to propagate (process repeats with a new decision assignment), or (3) a conflict is discovered (a variable is assigned both true and false).

Assignments in this process occur serially and are referred to as the assignment stack. The decision assignments in the stack partition the stack into decision levels. Assignments that are discovered to be absolute are said to be decision-level zero (DL 0). The first decision marks the beginning of DL 1. Each decision level then includes the Step 1 decision assignment plus all of the BCP-implied assignments discovered from that assignment. If BCP neither solves the problem nor ends in a conflict, a return to Step 1 marks a new decision level.

In the case of a conflict, a sub-process referred to as conflict analysis is invoked that has the following effect:
1. The assignment stack is rolled back to some earlier decision level (one or more levels) undoing assignments sufficient to resolve and avoid reoccurrence of the root conflict.
2. A learned conflict clause is generated. These clauses are logical implications of the original and previously learned clauses and can prune the search tree by capturing high-value information. All clauses, both original and learned, are stored in a data structure referred to as the clause database. Learned unit (single-literal) clauses are also added to DL 0. The conflict clause generation process may also add an assignment to the new top-of-stack decision level as a logical implication of the clause being generated. This assignment is then propagated by the normal BCP process. This round of BCP is treated as an extension of Step 2 of the high-level loop. Any new conflict would be resolved as described by Step 3.

A conflict caused by DL 0 assignments results in a return of UNSAT.

Smart Repair

Enabling Efficient Unrestricted Incremental SAT Solving: A key observation from the basic description of CDCL is that each learned clause is derived from one or more existing clauses. In this way, the clause database can be considered a Directed Acyclic Graph (DAG) rooted in the original clauses. When one or more original clauses is eliminated, any clause reachable in the DAG representation of the clause database loses its logical support and must be pruned. When the clause database is modified either through the addition or subtraction of original clauses, the solver is rolled back to DL 0 and the previous assignment stack is replayed as a sequence of decisions until it is exhausted or a conflict is found. This quickly rebuilds the internal data structures of the solver in a directed and consistent way. Note that rolling back the assignment stack has no impact on the clause database—learned clauses are not tied to a decision level and are strictly the logical consequence of their antecedent (predecessor) clauses in the DAG.

In this process, to manage learned clauses as a prerequisite for implementing unrestricted incremental solving in an efficient manner R-Solve leverages an MPI-connected multi-node architecture in which the DAG management is offloaded to a separate centralized process. This master process then serves as a bridge with an outward facing API to the user and an inward facing API to one or more solvers.

Applications of Smart Repair: Smart Repair is a fully general mechanism that extends the conventional capability of a SAT-solver so that it may address several additional real-world application domains. Examples of problem domains that benefit from the unrestricted incremental solving capability provided by Smart Repair include:

Planning in Dynamic Environments: Smart Repair permits the direct capture and incorporation of dynamic changes to the environment model of a constrained planning problem Modification scenarios that are supported with Smart Repair that were typically not adequately supported, if supported at all, with restricted incremental solving include at least: (i) Changes in the availability of a resource or asset; (ii) Emergence of new, or elimination of prior, obstacles or rules for employing assets; (ii) Changes in goal conditions or value of goals. Without Smart Repair, adaptation to any of these conditions would generally require abandoning all prior work and restarting with a new solver invocation. Smart Repair, however, enables reuse of all previous work that is not invalidated by the problem modification.

Planning with a Human in the Loop: In many practical applications, the solution to a planning problem rendered by a SAT solver is subject to review by a human before a commitment to executing the solution is made. Similar to planning in a dynamic environment, Smart Repair allows a human operator to either introduce new constraints or relax existing constraints for the purpose of driving to a new, more suitable solution that replaces an existing solution in part or in whole.

Iterating through a Solution Space: In native operation, a SAT solver returns a single solution to a constraint system. In many applications, such as model checking, each satisfying assignment decodes into a unique example of interest. Smart Repair enables solution space iteration by permitting revolving following the addition of constraints that specifically preclude the solution(s) already found.

Optimizing over Complex Constraints: SAT is an NP-complete problem. Solved repetitively for different fitness values, k, Smart Repair can produce provably optimal solutions for NP-hard k-optimization problems using strategic (nonsequential) search over the fitness space. In this method, the constraints encoding the fitness function are isolated and modified for each attempted k and the problem is resolved producing tighter solutions until the fitness value is found at which the problem transitions from SAT to UNSAT. The last fitness value returning SAT is provably optimal.

The addition of this capability means that SAT techniques can be applied to optimization problems with complex coordination, deconfliction and mutual-exclusion constraints (all of which have natural representations in Boolean logic), and fixed-point arithmetic constraints (including nonlinear constraints) which can encode as sequential circuits and thus translate to SAT. All complex optimization problems are generally search problems where the solution algorithm relies on some underlying assumptions or substructure—locality for hill-climbing methods, unrestricted matching for auction algorithms, the utility of combining parts of prior solutions for evolutionary algorithms, etc. SAT-based optimization is driven by a completely different set of substructure assumptions, namely a logical substructure expressed in the problem model. The addition of Smart Repair represents a new tool for addressing optimization problems that are not a good fit to the substructure assumptions exploited by other methods—problems with pervasive discontinuities or non-linearity in the fitness landscape, problems with deep logical constraints and problems with large infeasible solution regions.

Loosely Cooperative Parallelism with Clause Sharing

The CDCL algorithm is notoriously difficult to effectively parallelize. The algorithm is dominated by the BCP routine consuming 80-90% of runtime in many implementations, which exhibits extreme non-locality of memory references into the clause database. Further, while implied assignments are stored on a work queue, which can, in theory, be parallelized, in practice fine-grained parallelism has generally proven incompatible with the data structure used to access clauses for implication testing. This data structure is not read-only and requires modifications, in the form of pointer updates and literal swaps within each clause, which typically create difficult synchronization barriers. Despite attempts to smartly cluster the clauses, distributing the database has generally proven ineffective.

An alternate approach, parallelism by partial assignment, where each process picks up from a different fixed assignment to a subset of the variables, creates difficult load-balance issues. The lifetime of each assignment stack prefix is difficult to predict. Further, information from one process cannot generally be used by any other process since each is running from a different set of initial assignment assumptions.

In various embodiments, R-Solve can present a solution to these problems by building on a system of loosely cooperative parallelism. The CDCL algorithm contains a number of tunable tactics and random seeds that modify how the decision heuristic and conflict analysis processes operate. These choices form a space over which a solver can be configured. Differently configured solvers naturally drive to different parts of the search space. In experiments, it is not uncommon over 100 runs for the best solver to perform 5-25× faster than the median solver. Speed-up is achieved by having the solvers independently race to a solution. Various embodiments take advantage of this approach by sharing clauses learned by one solver among the other solvers to amplify the speedup. Specifically, in loosely cooperative parallelism with sharing—the independent solvers transmit especially high-value clauses (in particular, unit and binary clauses) to a master and the solvers check and incorporate any new clauses shared by the master on a periodic basis. Shared clauses that conflict with the local assignment stack can trigger a rollback and replay operation that is similar to the routine used when clauses are incrementally updated in Smart Repair.

As such, in R-Solve, the clause sharing infrastructure leverages the Smart Repair infrastructure—the master process managing the global Smart Repair clause implication DAG serves multiple solvers and provides a switchboard for detecting duplicate clauses and making rational choices about which clauses to share, as depicted in FIG. 1.

In one embodiment, R-Solve is built on Glucose 2.2, an open, publically-available CDCL SAT solver. Glucose is a competitive solver that has ranked at or near the top of both SAT and UNSAT application categories in competitions from 2009, 2011, 2012 and 2013. In addition to the standard CDCL algorithm, Glucose derives its performance from specific optimizations in constraint preprocessing, variable elimination, its decision heuristic, BCP work queue ordering, clause learning, clause reduction and learned clause attrition. As made available for download, Glucose is a strictly single-processor, sequential solver developed for execution on desktop hardware. As with all competitive solvers, Glucose is a command-line tool that accepts Boolean formulas in the standard DIMACS CNF format. Glucose is written in C++ and includes approximately 5000 lines of source code.

R-Solve Console: The user interface for various embodiments of R-Solve includes an interactive console that can run on a computing device. The console can connect to the master process, e.g., through a UNIX socket and communicates using Google Protocol Buffer messages. The console provides a robust set of commands to load, solve, incrementally update and test the solution to a problem instance and to manage the configuration and shutdown of the solver ensemble. In various embodiments, the console supports both blocking and nonlocking modes of solving, the nonlocking mode being necessary so that constraint updates can be passed to the solver while the solver is running. For testing and benchmarking, the console accepts problems in the standard CNF format, but understands stylized comments that delimit blocks of clauses that can be independently activated or deactivated. Each block is labeled and intuitively captures one or more high-level constraints.

R-Solve Ensemble API: The R-Solve ensemble is an MPI-connected collection of solver processes controlled by a master process. In various embodiments, the master process maintains the Smart Repair DAG, manages the loosely cooperative parallelism and communicates commands to a solver-side stub. The stub then presents to the solver the R-Solve ensemble API that provides a set of operations and data formats that the solver can utilize to participate in the ensemble. This API includes about twenty (20) routines for accepting a SAT instance, communicating learned clauses, accepting shared clauses and incremental updates, responding to requests for configuration changes and status queries, restarting and shutting down. Any CDCL solver can thus be adaptable for participation in an R-Solve ensemble provided that the necessary stub API calls and responses are integrated into the solver. In adapting Glucose, ~1000 lines of code were added or modified. One goal of the stub and API architecture is to compartmentalize the modifications that must be made to the core solver while eliminating the need to re-implement low-level details such as message buffering and synchronization. For testing and benchmarking, one ensemble was configured using a single file that maps an expression with a free variable for the rank of the solver process to each solver option. Independent evaluation of the expressions yielded unique initial configuration settings for each solver in the ensemble.

Support for Clause Modification: Many modern solvers can perform periodic clause simplification optimizations that rewrite existing clauses. For example, once a variable is assigned at DL 0, that variable may be removed from clauses that contain that variable in the opposite phase (an empty clause indicates UNSAT). In these cases, the rewritten clause is the logical consequence of existing clauses, however, if an antecedent of the rewritten clause is ever eliminated, it is necessary for correctness to restore the prior form of the clause. To do this, in some embodiments, Smart Repair supports undo edges that point from the rewritten clause to the prior representation as described below. If a Smart Repair operation removes the rewritten clause (but not the antecedent), then the undo edge can trigger a restore operation in which the antecedent clause is added to the set of clauses a solver must reincorporate.

Optimizations for Clause Sharing: It is common for cooperating solvers to learn identical clauses. In some embodiments, the master process uses a hashing scheme based on the number and identity of the literals in each learned clause to identify duplicates. Duplicate clauses are then not repetitively shared. However, the Smart Repair DAG retains duplicates with distinct antecedent sets. This increases the likelihood that at least one copy will be unaffected by an update.

Support for Graph Reduction: While the individual solvers may perform periodic attrition of seldom used or low-value clauses to manage the size of their local clause database, the master process generally cannot prune arbitrary nodes from the clause DAG while retaining the reachability criteria without the potential for cross-product edge explosion. In various embodiments, while the solvers communicate removed learned clauses to the master process and while those clause nodes/vertices may be removed by the master when they have out-degree of 0 or 1, there is still a need to enforce a hard upper limit on the size of the master graph. To enforce a limit, in various embodiments, R-Solve a technique similar to that used when original clauses are removed in Smart Repair. A subset of the original clauses is selected and "removed" temporarily and is then immediately reinserted. The effect is that all learned clauses reachable from the selected original clauses that are temporarily removed are pruned from the graph. As an optimization, in some embodiments, communication of the removed clauses to the solvers is delayed until the next actual Smart Repair operation. In the interim, new learned clauses that have removed clauses as antecedents are added to the set of clauses to be removed at the next operation rather than added to the DAG. Through this "lazy" mechanism, the solvers can continue to benefit from the pruned (but not invalid) learned clauses until the next Smart Repair operation. This operation can be repeated iteratively until the desired reduction in total graph size is achieved.

Smart Repair

Smart Repair refers to a technology that enables maximizing efficiency of solving a series of "similar" SAT problems that may be modified in an iterative manner by preserving and reusing costly computation done in previous iterations. In various embodiments, R-Solve as a parallel SAT solver implements Smart Repair.

The goal of Smart Repair is to solve a series of similar SAT problems, each of which varies only slightly from the problem that precedes it. The degree of variation is described as two sets of clauses, one to add and the other to remove. Many modern SAT solvers typically generate and maintain a lot of redundant learnt clauses derived through conflict analysis while running. They are redundant in the sense that they are logical consequences from a subset of the original set of clauses and thus can be discarded freely. In this setting, adding new clauses to an existing set of constraints does not pose any considerable problem in general regarding the validity of the learnt clauses; all the learnt clauses generated in the past solving iterations remain valid because all of them are still derivable from the updated set of constraints. However, removing some of the original clauses can easily violate the validity of some of the learnt clauses because they may no longer be derivable from the updated set of the original clauses.

A Smart Repair graph is a graph devised to book-keep the interdependency information of clauses to address the issues that may arise when removing clauses. In simple words, it is a graph that describes all the derivation relationships of clauses generated across all the solvers in the system; the graph keeps track of antecedents for each clause, from which the said clause can be derived. By maintaining the interdependency information, Smart Repair can identify all the clauses that are no longer valid and tell each solver to discard the invalidated clauses before they start solving again, in some other iteration, when some of the original clauses are removed. The procedure to identify all the clauses that are not derivable any more is generally a reachability that can be a one-time traversal of the graph.

Figures 2A, 2B:
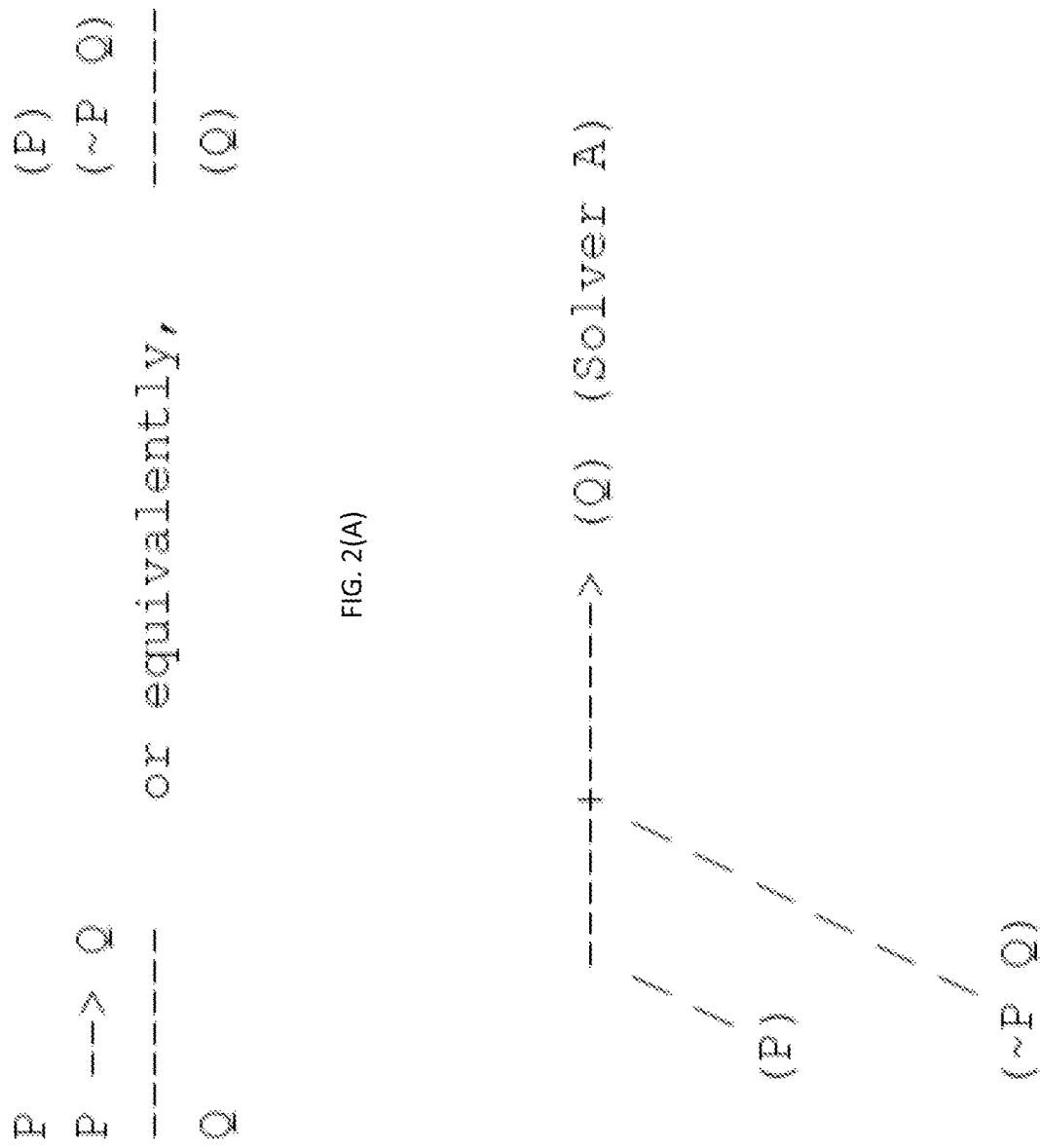
FIG. 2(A) depicts an example CNF problem.
FIGS. 2(B) and 2(C) depict data structures respectively maintained by two solvers, according to one embodiment.

Generally, there exists only one master/central graph in various embodiments of R-Solve. The master graph can be viewed as an aggregation of separate and independent graphs in general, each of which is local and corresponds to one of the solvers in the system. To illustrate, in one embodiment, with reference to FIG. 2(A), Solver A deduces (Q) after storing (P) and (~P Q). Solver A may maintain a data structure (e.g., a graph, table, hash table, etc.), representing the various learned clauses, and relationships there between and the original clauses. FIG. 2(B) depicts an example graph generated and maintained by Solver A.

Figure 2C:
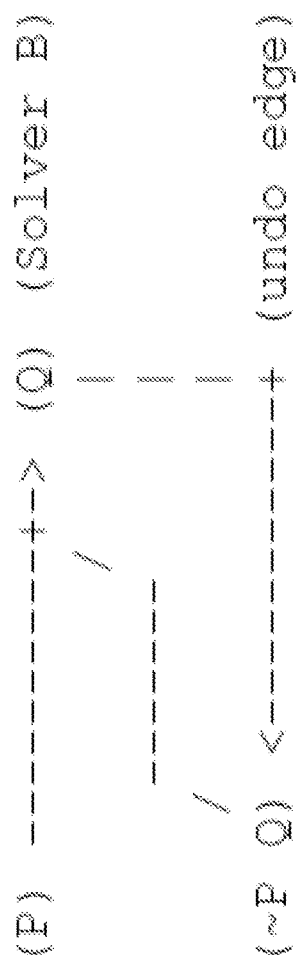
Figure 2D:
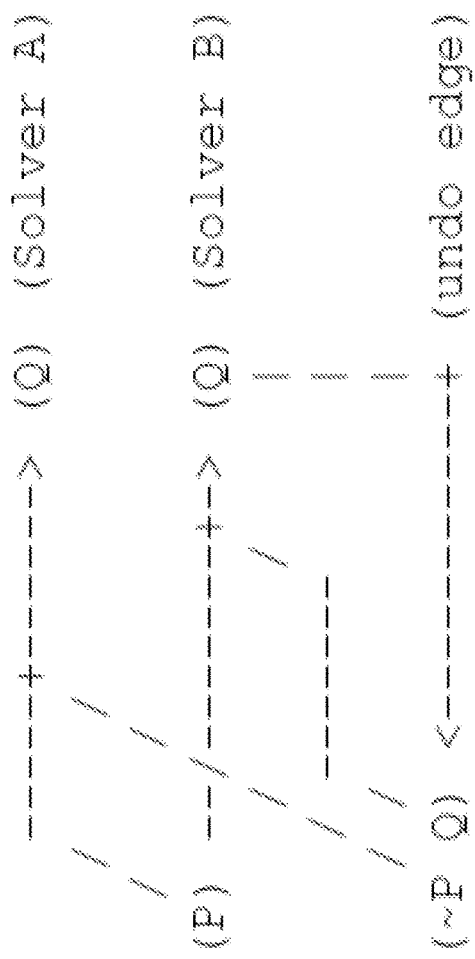
FIG. 2(D) depicts a data structure corresponding to those shown in FIGS. 2(B) and 2(C) that is maintained by a master/controller, according to one embodiment.

Referring back to FIG. 2(A), Solver B stores (P), deduces (Q) from (~P Q) and discards (~P Q). An example graph generated and maintained by Solver B is shown in FIG. 2(C). In this graph, there is an undo edge from (Q) to (~P Q). In various embodiments, the solvers inform a controller the clauses they have learned and/or discarded. Accordingly, the controller generates and maintains a master data structure (e.g. a master graph, master table, etc.) representing the original clauses and the clauses learned by all solvers in the ensemble. Different solvers may independently learn the same clause. For example, in one embodiment both Solver A and Solver B learn the clause (Q). As shown in FIG. 2(D) the master graph (data structure, in general) generates different vertices representing the same clause, and associates each vertex with the solver that learned the corresponding clause.

In one embodiment, after invalidating (P), Solver A receives a message to remove (Q). Solver B receives a message to remove (Q) and another message to add (~P Q), which is triggered by the undo edge in the master graph.

Mark-and-sweep of Invalid Vertices: Removing a set of clauses from a problem instance generally amounts to a task of mark-and-sweep of the Smart Repair graph: starting from the ground vertices corresponding to the clauses to be removed, Smart Repair marks all reachable vertices invalid by following all forward, antecedent edges (excluding undo edges). All marked vertices are gathered, and the ID's of the clauses of the invalid vertices are sent to corresponding solvers. Note that normally, a vertex and the clause corresponding to the vertex belong to only one solver except ground vertices. A ground vertex generally corresponds to an original clause. In order to change a SAT problem to be solved, a user can add an original clause and/or remove an original clause. Correspondingly, one or more ground vertices may be added and/or one or more ground vertices may be removed. In some instances, one or more ground vertices may be selected for pruning the master graph. As described below, in pruning, the selected ground vertices (i.e., the corresponding original clauses) are considered to be removed temporarily. Therefore, following the marking process described above, all the clauses learned from the selected original clauses can be removed, to reduce the size of the master graph.

Marking certain vertices may additionally trigger restoring clauses designated by undo edges. In various embodiments, the master/controller determines whether to restore such clauses. Undo edges can be chained and vertices pointed to by an undo edge may also have been invalidated as well. Therefore, the controller may evaluate a path through a chain of undo edges until a vertex not marked for removal is found. The controller may then restore the clause corresponding to the first unmarked vertex. In some instances, such a vertex may be a ground vertex corresponding to an original clause.

Undo Edge: An undo edge is nothing a tool and a trigger that can perform a specific task: if there is an undo edge from V2 to V1, and if V2 is invalidated and V1 is not invalidated, the clause of V1 will be sent to be added as a new clause to a solver that owns V2. This allows that solver to restore a clause when necessary. An undo edge is added in the master graph when requested by a solver via an application program interface (API).

General properties that an undo edge from V2 to V1 implies include:
1. V1 is a vertex corresponding to an original clause or a learnt clause, from the perspective of a solver.
2. V2 is always created later than V1 is.
3. The clause of V1 is removed and no longer exists in the solver or is masked "not to be used".
4. The clause of V1 is designated to be added back to the owner of V2 if V2 is invalidated in later solving iterations.
5. V2 is often (but not always) a simplified original clause resulted from V1 (e.g., some false literals removed from a clause).
6. Quite often, there is an antecedent edge also called a successor edge from V1 to V2 in the opposite (forward) direction, particularly if V2 is a simplified clause derived from V1.
7. Undo edges can be chained; in fact, if it were not for Variable Elimination, any undo edge chain should lead to and terminate at a ground vertex.
8. All the undo edges in a chain may belong to one solver and except the ground vertex, all vertices involved in the chain may also belong to that solver.
9. A vertex will typically, but not necessarily have at most one outgoing undo edge. If there are more than one undo edges from a vertex, however, multiple clauses would have to be restored when the vertex is invalidated.
10. Only a ground vertex may have more than one incoming undo edge, each from different solvers.

Note also that if there were no undo edges, the Smart Repair graph would always be a DAG (Directed Acyclic Graph).

Glossary clause: disjunction of literals, where a literal is either a variable or its negation, e.g., (P A ~Q). Often, written simply as a list of literals, e.g., (P ~Q).

CNF: Conjunctive Normal Form. Typical input to a general-purpose SAT solver, describing a SAT instance. It is conjunction of clauses (or constraints), which is in fact a propositional (boolean) logic formula as a whole, and can be called a formula as such. Also can be viewed as a set of clauses.

original clause: an original clause from the perspective of a solver is a clause that is indeed part of the current problem instance. In other words, they are absolutely required and cannot be discarded except by a user; removing such a clause may result in forming a different formula. A solver will maintain a list of original clauses, apart from a list of learnt clauses. An original clause from the perspective of Master can be thought of as the original, raw clauses taken as-is from an input CNF file. Throughout this document, this term may be used to refer to an original clause from the perspective of a solver. Occasionally, the term 'ground clauses' or 'ground vertices' are used to refer to the original clauses in a CNF file, as they are at the very first level in the Smart Repair graph (master graph).

learnt clause: a redundant clause derived e.g., during DPLL, by conflict analysis in a CDCL (Conflict-Driven Clause-Learning) solver. All learnt clauses or any subset thereof may be removed. Each learnt clause is a natural deduction from a set of original clauses. A solver may maintain a list of learnt clauses, apart from a list of original clauses. The rate of growth of a learnt clause database is high in general, and some modern solvers periodically reduce the database on a frequent basis, e.g., attempting to halve the size of the database at each reduction operation.

unit clause: in this document, generally a clause having only one literal. In a broader sense, and typically in the context of SAT, can also refer to a clause of size greater than one where only one of its literals is unassigned and the others are all false, which would induce unit propagation. In this document, this term is used interchangeably with the term 'assignment', since solvers would not typically create and store an actual concrete clause for a unit clause, but rather make an assignment to the sole variable literal.

binary clause: a clause having exactly two literals.

empty clause: a clause containing no literal, which can never be satisfied by any assignment. The presence of an empty clause will therefore imply UNSAT, i.e., the specified CNF problem is unsolvable.

unit propagation: an assignment to a variable can trigger unit propagation, if there is a clause that becomes unit due to the assignment.

BCP: Boolean Constraint Propagation.

watchers/watches/watched literals/two-literal watching: for the purpose of triggering unit propagation in an efficient manner, one only needs to watch at most two literals per clause. The two-watched-literal scheme is standard in many modern SAT solvers. For example, for a clause (P Q R S), a solver may watch two arbitrary unassigned literals, say P and Q (assuming that P and Q are unassigned). Then this clause will be included in the two separate watcher lists of ~P and ~Q respectively, so that if ~P or ~Q becomes true, the clause can be visited through the watcher lists. Note that assigning P or Q false will make the solver find and watch another unassigned literal in the clause. If P and Q were the only two unassigned literals, then the solver would know that the clause triggers unit propagation.

resolution: An inference rule used in many modern SAT solvers to deduce new facts (unit propagation can be regarded as a special case of resolution). The rule says that, if (~P l1 l2 . . . ln) and (P ln+1 ln+2 . . . lm) are true, then we can conclude that (l1 l2 . . . lm) is true (where li is an arbitrary literal of a variable other than P). Accordingly, in this document, it will be occasionally said that the variable P has been resolved out by resolution. (l1 l2 . . . lm) is called a resolvent. Note that modus ponens is also a special case of resolution; if P->Q and P are true, Q is true. (P->Q<==>(~P Q)). Resolution on (A) and (~A), which are contradicting, will result in an empty clause.

resolvent: A variable that is resolved out by resolution.

vertex/node: Generally, a vertex corresponds to a clause, and these terms (i.e., vertex, node and clause) are frequently used interchangeably.

antecedent: in general, a set of all direct antecedents of a node implies that the clause referred to by the node can be derived (and was actually derived by and exists in a solver as a clause) from the set of antecedents.

undo edge: a tool and a trigger that performs a specific task: if there is an undo edge from V2 to V1, and if V2 is invalidated and V1 is not invalidated, the clause of V1 will be sent to be added as a new clause to a solver that owns V2. If V1 is also invalidated, a vertex that is reachable from V1 via undo edges and that is not invalidated may be sent to be added as a new clause to the solver than owns V2.

DPLL: Davis-Putnam-Logemann-Loveland algorithm. A non-chronological backtracking algorithm for deciding satisfiability of CNF-SAT problems. It is the main algorithm of many modern SAT solvers.

conflict: if all literals of a clause are false, the clause is conflicting. If a clause is conflicting at decision level 0, the problem is UNSAT. If conflicting at other decision levels, modern SAT solvers will analyze the conflict and generate as a result, mostly, one learnt clause, including a unit clause. The conflict analysis may also suggest a proper decision level to backtrack, and modern solvers may backtrack more than one level whenever there is a conflict.

conflict analysis: is the process of deriving or learning conflicts.

model: can be a satisfying solution (assignments to all existing variables) to a formula.

Central Data Repository: One embodiment of R-Solve maintains a central data structure, a deduction graph, for the purpose of Smart Repair, and this central data structure allows controlling several solvers solving a CNF problem in parallel.

In some implementations, scalability in terms of the number of solvers running parallel may be limited, as the central data structure (e.g., a graph) needs to keep the entire diagram having every clause ever generated by any solver. A structure can be maintained locally and on a per-solver basis, as data computed by a solver is local and independent of other peers' data. This, however, would make sharing clauses difficult if not impossible. The central data structure allows for sharing clauses efficiently in a parallel solver architecture. Scalability might not be an issue for at least some users of different embodiments of R-Solve, as an important objective is to solve many "continuous" problems more efficiently that can be answered in a short time frame, rather than solving and modifying problems each individually requiring significant amount of time.

One advantage of the central data management is the ability to perform useful computations on the entire data gathered from all solvers. For example, in some implementations of the parallel architecture of R-Solve, clause sharing mechanism uses the central data structure while functioning independently of Smart Repair.

Globally Unique Identifiers: Every vertex in the Smart Repair graph may be associated with a globally unique identifier. To eliminate costly communication overhead when a solver needs to generate a large number of globally unique identifiers, each MPI process is provided with a facility that can generate identifiers locally that are guaranteed to be globally unique. To achieve the uniqueness across all MPI processes, a portion of an identifier is designated to store an actual MPI rank (e.g., a number representing the order in which the MPI processes are initiated), which is unique to each process. In one embodiment, 32 bits are used for an identifier, where 6 bits are reserved for storing a rank number. This implies that in this embodiment R-Solve can launch up to 63 solvers. Each solver can generate, roughly, up to 2A26 identifiers locally.

With reference to FIG. 3, according to one structure of the unique identifiers, the first 6 bits, which can be accessed by 'fst', can store a rank number, and the rest 26 bits, which can be accessed by 'snd', can store a locally unique number. A process generating new IDs at each solver may throw an exception if its internal counter reaches the limit of 2A26. Note that once the limit is reached, a solver can become practically unusable until the current problem is reset, e.g., by a user. In the case of the exception, the MPI process for the solver will immediately escape back to the top-level main MPI message polling loop, and any further MPI messages sent by the controller may be consumed only to be discarded until the reset message is received. If all the solvers reach the limit, Console will receive immediately a message from the Master indicating that the attempt to solve the specified CNF problem has failed. No modification is necessary on the solver-side regarding the handling of the exception. The main polling loop of a solver according to one embodiment is depicted in FIG. 4.

In some embodiments, reusing IDs is possible. A solver can generate more than 2A26 IDs, e.g., by allocating more than 32 bits (e.g., 40, 64, etc.) bits to the identifier. In many instances, it would be impractical, however, to have and store more than 2A26 clauses at any point. If a solver had that many clauses, often the computation would be slowed down to the point of almost stopping due to the size of the solver database. In some embodiments, a solver may request its own ID generator to reuse some old IDs that no longer exist globally. Ensuring the absolute non-existence of such IDs takes into account clause sharing and clause buffering.

Integrating Solvers

Mappings between Solver Clauses and Vertices in Smart Repair Graph. In various embodiments, R-Solve implementation is independent of any specific solvers. The interface that solvers use can only accept and understand IDs of the vertices in the Smart Repair Graph, i.e., the master graph generated and manifested by the controller. Therefore, the solvers must associate the vertex IDs with their matching clauses and maintain a one-to-one mapping on their side. The scope of aforementioned clauses include unit clauses (i.e., top-level assignments) and empty clauses.

Typically, a solver includes two maps: one for clauses other than unit clauses, and the other for unit clauses, which are essentially top-level assignments.

1. Between Vertex IDs and Solver Clauses: A solver has its own unique identifier in some form for every clause in the local solver database, e.g., in the form of an explicit memory pointer. Many solvers, including Glucose, employ garbage collection and the identifiers for clauses may be dynamically changed. Taking into account such local changes, the solvers updated the mapping.

2. Between Vertex ID's and Top-level Assignments: Although Smart Repair does not differentiate unit clauses from other clauses, many solvers do not store top level assignments in the form of unit clauses. Therefore, a solver may need a separate data structure than the one used for clauses for the mapping.

Adding or Removing Clauses: In some iterations, before Master sends out a solve request, each solver receives a set of clauses to add and another set of clauses to remove, if any. From the perspective of solvers, there are only two sets of clauses: one to add, and the other to remove. This means that clauses restored because of invalidation of some clauses will be simply understood as new clauses to add on the solver-side.

One important rule in Smart Repair when adding new clauses when the smart repair is done instantaneously, e.g., in response to a user command, is that every clause to be added is processed by the solver; solver should not exit and ignore the rest of the clauses in the middle of adding clauses even if it learned that the problem is UNSAT. Another important rule is that solvers remove invalid clauses first before adding new clauses.

In some implementations of R-Solve, a solve request is designed to be sent out only when all solvers are waiting idle and at decision level 0. Solvers will backtrack to decision level 0 when they stop running, and adding clauses will then be done at decision level 0. Clauses may be added or removed at decision levels other than 0, in some embodiments. Modern SAT solvers employ the strategy of frequent restarts combined with phase saving, and this may bring solvers back to the top-level a few dozen times per second.

Adding Clauses:

In various embodiments, solvers remove invalid clauses first before adding new clauses.

New clauses can introduce fresh new variables. Therefore, the solvers may inspect all the new clauses at the beginning of each solving, to identify any new variables.

First of all, when adding a clause, a solver may need to make a copy of the original clause before it starts modifying it, because the solver has the responsibility to provide the original form to Master if any modification is made.

Typically, a solver may perform one or more of the following tasks:

1. Ignoring trivially true clauses, e.g., (−1 2 1)
2. Ignoring already satisfied clauses
3. Removing false literals in a clause In the case of 1, a solver can silently ignore such clauses too when it comes to Smart Repair provides such clauses. In the case of 2, a solver notifies Master (i.e., controller) that it did modify (in fact, removed) the original clause and providing the sole antecedent of the unit clause for the true literal (true assignment to the variable at decision level 0) that makes the clause satisfied. That is, the clause being ignored is not an antecedent of a new vertex being created as described below.

In the case of 3, whenever a solver finds that a literal in the clause is false under the current assignment (at decision level 0), it may add the unit clause for the false literal to the list of antecedents. The same antecedents may not be added multiple times if there are duplicate literals. Note that it is possible that the clause can become empty.

In the end, if the clause was not a trivially true one or there did not exist a true literal, a solver will be left with the following cases.

1. empty clause
2. non-empty, non-unit clause
3. unit clause

Note that all the remaining literals in the resulting clause should be undefined (unassigned).

If there have been no false literals in the original clause, the list of antecedents will have been empty. In that case, a solver does not need to notify Master of anything, because it indicates that the clause has not been modified at all. This principle applies to all of the three cases above.

1. For an empty clause (either because it was initially empty or became empty after removing false literals), the solver may add it to the list of empty clauses maintained separately for the sake of Smart Repair. If the empty clause is a derived one (i.e., all of the literals in the original clause are currently false), the solver may notify Master of the modification after adding the original clause itself to the list of accumulated antecedents.

Example 1: An empty clause has been pushed by Master (can only happen if the empty clause was explicitly requested to be added by Console). A solver will add the given identifier for the empty clause to its list of empty clauses. Nothing needs to be notified to Master.

Example 2: A clause (~P ~Q ~R) has been pushed by Master. Under the current assignment (at decision level 0), all of P, Q, and R are true. A solver will notify Master of a new empty clause with the antecedents of (P), (Q), (R), and (~P ~Q ~R). The solver will add the newly derived empty clause (e.g., just the identifier of the new vertex for the derived empty clause) to its list of empty clauses.

2. If the clause is neither empty nor unit, the basic principle is same: if modified, solver notifies Master, with the difference being that the clause will be added to the clause database instead of the list of empty clauses.

Example 3: A clause (~P ~Q ~R) has been pushed by Master. If P, Q, and R are all unassigned, a solver will add the clause to the database as-is. The solver will maintain a mapping between the given RID (i.e., identifier) for the clause and the clause store in the database. Nothing needs to be notified to Master.

Example 4: A clause (~P ~Q ~R) has been pushed by Master. If R is the only variable assigned true, a solver will add (~P ~Q) and notify Master of the new clause with the antecedents of (R) and (~P ~Q ~R). The solver will also maintain a mapping between the RID of the new vertex that will be created shortly in the Smart Repair graph and the clause (~P ~Q) on the solver-side.

The case of an unit clause is similar to the above case, except that a solver will additionally assert it as a top-level assignment and, often will perform BCP immediately. BCP can further trigger top-level assignments to many variables. It is also possible that the BCP results in a conflict, in which case an empty clause is derived. In either case, Master will be further notified of those unit and empty clauses derived during BCP.

Removing Clauses:

Like in the case of adding clauses, clauses are generally removed at decision level 0. The removing process includes: removing the clauses and assignments corresponding to the specified vertex IDs. The clauses (and assignments) must exist in the solver database. Mappings for the invalidated clauses and/or assignments are also removed from the ID maps.

Removing top-level assignments requires special attention. A solver may check and fix watchers of all existing clauses, whether original or learnt. In addition, in some embodiments some solvers manipulate an assignment stack directly and make the variables eligible for selection as decision variables.

Simplification of Original Clauses: Basic workings of Smart Repair is plain. What adds complexity is a solver making various kinds of usual and natural modification to the original clauses on which it started to work. Such modifications range from removing a single literal from a clause or permanently discarding satisfied clauses to applying many sophisticated simplification techniques in the preprocessing step. As an example, the simplification of removing false literals is being carried out when adding new clauses. In that case, it was straightforward to identify all the antecedents of the simplification. However, the set of antecedents may not always seem apparent when complex simplification techniques are used and interrelated. Sophisticated and costly simplification techniques are generally applied in the preprocessing step once, but some can also be applied periodically while solving.

In various implementations, solvers do not escape in the middle of preprocessing even if the problem is determined to be UNSAT, for maximum processing of the initial problem set so as to be prepared for future iterations of Smart Repair solving.

Subsumption: A clause subsumes another, if the former is a subset of the latter. The subsumed clause is a weaker constraint than the subsuming clause and is thus useless. Removing a subsumed original clause is generally similar to removing a satisfied original clause. Master is notified with the sole antecedent of the subsuming clause.

Removing Satisfied Original Clauses: Solvers may periodically remove satisfied clauses, whether they are original or learnt. Solvers notify Master when removing original clauses, similar to the subsumption case.

Removing Learnt Clauses: Solvers do not need to notify Master when removing learnt clauses. However, to lessen the burden of maintaining a large graph on the Master-side, solvers may notify the Master when learnt clauses are removed. It is generally expected that a huge amount of learnt clauses are discarded each time a solver performs reduction of learnt clause database, and in order to help reduce the size of the Smart Repair graph as soon as possible after the reduction, the interface between Solvers and Master is designed to stack the removed clauses in a buffer and a solver is required to explicitly control flushing of the buffered clauses. Thus, the Master will receive the clauses only when the Solvers invoke the flush process, and a solver is thus expected to invoke that process at the end of reduction. The process of flushing may also flush any remaining learnt clauses buffered so far before sending the buffered removed clauses, to avoid removing a learnt clause that Solver has not reported to the Master yet.

In some embodiments, a solver may pass RIDs of shared clauses to the procedure that removes clauses. Any clauses received from other solvers or sent to Master to be shared with others Solvers may be excluded during removal.

There may be other instances when learnt clauses are removed, e.g., when removing satisfied learnt clauses. Rate of flushing can be controlled so that it does not generate excessive communication between solvers and Master. In some embodiments, flushing is done only at the end of each learnt clause database reduction.

Learnt Clauses: Whenever a solver registers a new learnt clause in the learnt clause database (or makes assignments at decision level 0), whether learnt by conflict analysis or BCP, it notifies Master about the clauses so that they can revoked in later Smart Repair solving rounds if required. Normally, a learnt clause refers to a clause generated by conflict analysis initiated when a conflict is reached. In the usual context, learning a unit clause implies an assignment at decision level 0, and therefore, often the unit learnt clauses are not actually considered "clauses." However, we will not exclude unit clauses when referring to clauses basically, and will use the two terms 'unit clauses' and 'assignments at decision level 0' interchangeably. Besides the clauses learnt from conflict analysis, learnt clause may include unit and empty clauses "learnt" from BCP.

Propagations and Conflicts at Decision Level 0: In various embodiments, every assignment at decision level 0, or facts, derived by BCP are notified to Master, just like learning a unit clause from conflict analysis, because they can be nullified if any of the antecedents becomes invalid. In fact, such an assignment is a derivable unit clause. Note that assignments to variables not at decision level 0 are not facts (i.e., not derivable), and may not be notified. The BCP routine may include routines to test if any variable is being assigned at the top level and notify Master of the new unit clauses with proper antecedents by calling a suitable procedure.

Example 1: If P is about to be asserted as facts during BCP knowing that both Q and R are true and there is a clause (P ~Q ~R), notify Master that (P) is a unit clause derived from (Q), (R), and (P ~Q ~R). Similarly, if a conflict occurs at decision level 0, an empty clause is notified to Master.

Example 2: If, at decision level 0, (~P ~Q ~R) is conflicting because all of P, Q, and R are true, notify Master of an empty clause whose antecedents are (P), (Q), (R), and (~P ~Q ~R).

Conflict-Driven Clause Learning: Clause learning in many modern SAT solvers is driven by conflicts; solvers may derive one or more learnt clause when a conflict is reached (although one per conflict is common). Those learnt clauses are derivable from the base set of original clauses and thus redundant; they can be discarded any time. A learnt clause can be a unit clause as well. In this case, it would naturally be understood as an assignment (at decision level 0), rather than as a clause. The way they are derived is typically a series of application of resolution on conflicting clauses.

Example 1

1. A solver is at decision level L3. Currently, A, B, and P are all assigned false, whereas X, Y, and Z are unassigned. Assume no further BCP is possible and it did not lead to a conflict.
2. The solver advances to a new decision level L4. It happens to pick the unassigned X as a decision variable and assigns false to it.
3. The solver initiates BCP, and Y is assigned false by (~Y X A) during unit propagation (as X and A are currently false).
4. Similarly, Z is assigned false by (~Z Y B).
5. Unfortunately, BCP hits a conflicting clause (Z Y X P), in which all literals are false.
6. Applying resolution on (Z Y X P) and (~Z Y B) with respect to Z results in (Y X P B). (Taking all literals from both clauses excluding Z or ~Z).
7. Applying resolution on this new clause (Y X P B) and (~Y X A) with respect to Y results in (X P B A).

The process of 6-7 is generally called conflict analysis. Note that both of the clauses (Y X P B) and (X P B A) generated in the analysis are new deductions derivable from existing clauses. Among them, many modern SAT solvers will typically add only the latter clause (X P B A) to the learnt clause database, which is the first Unique Implication Point (UIP) encountered during the conflict analysis. (There may be second or third UIP as well). Being a clause at UIP, (X P B A) contains only one variable, X, whose decision level is at the current level L4. In this example, X happens to be a decision variable, but it need not be. The significance of UIP is its implication that X should have been assigned true at an earlier decision level. For example, if A and B had been assigned at level L0, and P at level 5, then X should have been assigned true at level L0 by BCP. Many modern solvers can typically backtrack to level L0 and resume BCP.

Thus, in general, the way the conflict analysis is typically carried out to reach the first UIP is to apply resolution on the variables of the current decision level, starting with the conflicting clause, until there remains only one variable of the current level. In the previous example, the conflicting clause was (Z Y X P), and Z and Y were the variables assigned at the level L4. Z and Y were propagated by (~Z Y B) and (~Y X A) respectively, so those clauses were used in resolution.

As can be seen from the foregoing example, identifying antecedents of a new learnt clause is straightforward: all clauses involved in resolution during the conflict analysis are antecedents. In this example, (X P B A) is derivable from (Z Y X P), (~Z Y B), and (~Y X A). One caveat, though, is that solvers typically rule out variables assigned at decision level 0 in the process of conflict analysis, since they are irrefutable facts. For example, if (~B) were asserted at decision level 0, the two clauses to be generated in the conflict analysis would be (Y X P) and (X P A), instead of (Y X P B) and (X P B A) respectively. In this case, the antecedent list of (X P A) may include the unit clause (~B) as well.

In various embodiments, solvers notify Master of new learnt clauses. Note also that they can be unit (assignments at decision level 0). However, solvers typically try to reduce the number of the learnt clauses before actually registering them in the learnt clause database; in that case, solvers may notify the Master only after finishing the learnt clause minimization.

Learnt Clause Minimization: Often, this is also called conflict clause minimization, the reason being that a new learnt clause is conflicting at the current decision level. In the above example, (X P B A) is conflicting. Typically, the resolution is the basic principle used in various techniques applied to minimize a learnt clause, very much like that it is the case in conflict analysis. If a literal can be removed, or a set of literals can be removed to result in a smaller number of literals, then there does exist a justification for it, explaining that a new learnt clause smaller than the current one can be derived from a certain set of clauses. Fundamentally, solvers will be deriving such clauses by applying a series of resolutions to the original learnt clause.

One-sided Undo Edges: Normally, if there is an undo edge between two vertices, there is an antecedent edge in the opposite direction expected to coexist between them. An undo edge indicates that the clause of the destination vertex should be restored if the source vertex is invalidated, and often the clause of the source vertex of the undo edge is a direct simplification of (and is actually derived from) the clause of the destination vertex. However, following are some cases where various implementations may result in one-sided undo edges in the Smart Repair graph.

1. Subsumption:
C1 (A B C)
C2 (A B)

In this example, C1 exists in the original clause database. It is possible that C2 becomes invalid while C1 remains intact. C2 subsumes C1, and thus C1 is not necessary. A solver may simply remove CL. In this case, it would be sufficient to introduce an undo edge from C2 to C1. Note that there should not be an antecedent edge from C1 to C2; it would invalidate C2 if C1 got invalidated. In some embodiments, R Solve creates a dummy vertex, say V, as a successor of C2 and adds an undo edge from V to C1, while it does not introduce an antecedent edge from C1 to V. The dummy vertex can generally be removed when C2 becomes invalid.

This implementation is not necessary; an undo edge can be added from C2 to C1 without adding an antecedent edge from C1 to C2. One reason, however, for the dummy vertex is for simplicity; not seeing it as a special case, it can be handled in the general way of utilizing the Smart Repair framework according to various embodiments with no modification to the interface that solvers use. Another reason is to not relax the invariant that an edge is an undo one if a source vertex is created after a destination vertex. In some implementations, the invariant may be relaxed by introducing a new flag in the graph library for the indication of whether an edge is undo or not.

One reason for having C1 as an antecedent of V is to maintain the invariant that if there is an undo edge, there exists a complementing antecedent edge in the opposite direction. In some sense, V can just be thought of as (A B), and not a dummy, that can be derived from C2 (and C1 if decided to place a complementing antecedent edge). In this sense, V fits seamlessly with the invariant that V is a logical consequence of C2 (and C1). Note that Smart Repair vertices do not store actual clauses unless there is an incoming undo edge, and since V will not be seen as a concrete clause (A B) on the solver-side (no reason to derive and add exactly the same clause as C2), V will always be a leaf vertex having no actual clause. In other words, one can assume it is either a vertex of (A B) or a dummy vertex. Various implementations do not force an antecedent edge from C1 to C2, or from C1 to V.

2. Satisfied Clauses:

This case is in fact a special case of subsumption. A solver may refuse to add a new clause given by Master, if the clause is already satisfied, or it can remove existing clauses that became satisfied at any moment. In either case, the behavior is the same as the case with subsumption: a dummy vertex is created.

3. Asymmetric Branching (Special Case of Clause Vivification):

Some Solvers (e.g., MiniSat, Glucose) can remove a literal in a clause (may happen only once in the preprocessing step) in a certain condition: if assigning false to all the literals other than the literal that it tries to remove and performing BCP induces a conflict. Example:

(A B C)

If conflict is reached after setting B and C false and trying BCP, we can conclude that (B C) is somehow implied (i.e., you cannot set B and C false), and thus the Solver can remove the literal A. However, for the purpose of Smart Repair, we do need to know how exactly (B C) can be derived, and various implementation performs conflict analysis for it. Often, the unmodified clause (A B C) is one of the antecedents of (B C), but at the same time, quite often it is not the case. For example, (B C) can be derived from (B C ~D) and (D C); it can even be the case that there existed a concrete clause (B C) from the beginning.

In any case, a new vertex for (B C) is created (an optimization could be done to rule out the direct subsumption case), and an undo edge is created from (B C) to (A B C); note that the new clause (B C) in this sense is very much like a learnt clause. (B C) has all the antecedents computed from the conflict analysis, but may not have (A B C) as an antecedent as explained earlier. Note that it is not desirable to force an antecedent edge from (A B C) to (B C), since we would lose (B C) unnecessarily if (A B C) becomes invalid (although it does not affect the correctness). As a result, we can have an undo edge without its complementing antecedent edge.

Also note that it can be thought not only that (B C) is an in-place shrinking of (A B C), but that (B C) is a new derived clause and (A B C) is subsumed and removed. In the latter sense, this case is similar to subsumption in general, except one notable difference that the new derived (B C) can be discarded freely if (A B C) becomes invalid; in other words, this case can also be handled by creating a dummy vertex as in the subsumption case so as to maintain the invariant of complementing nature of an undo edge and an antecedent edge.

In fact, one can take a hybrid approach: if (A B C) turned out to be one of the antecedents of (B C) by conflict analysis, an undo edge is directly introduced from (B C) to (A B C); otherwise, a dummy vertex is created as in the subsumption case, to maintain the aforementioned invariant.

4. Other Potential Techniques that Removes Literals from a Clause:

Other potential simplification techniques may be able to remove one or more literals from a clause, which could naturally be thought of as an in-place shrinking, and then the original clause subject to such modification is not one of the antecedents of the resulting clause like in the asymmetric branching. A dummy vertex having an outgoing undo edge can be created in such cases.

Empty Clauses: An empty clause is a clause with no literals, which is unsatisfiable by definition in logic. The rationale is that there exists a clause yet no way to satisfy the clause since it has no literal. As such, the presence of an empty clause entails UNSAT, and it is indeed a piece of proof that a problem is UNSAT i.e., a proof that no solution exists to the specified CNF problem. Likewise, the fact that a problem is UNSAT implies that an empty clause is certainly derivable somehow. One example of deriving an empty clause is applying resolution on two unit clauses (P) and (~P).

In one way, a problem can be considered a 'theory' in the context of logic. Saying that a problem is UNSAT is equivalent of saying that the theory is 'inconsistent' in the logic world. If a theory is inconsistent, every 'statement' is true; you can assume both (P) and (~P) are true, or any arbitrary clause is true. It is largely of not much use to deduce new facts in an inconsistent theory.

In fact, the moment at which a SAT solver can conclude UNSAT is precisely when an empty clause is derived. However, typical solvers would not explicitly draw an empty clause or create a concrete object for it; there is simply no reason to do so, as what they can do is to halt and return UNSAT immediately. Similarly, solvers are not generally designed to assume conflicting assignments to a variable. Some solvers might create and keep unit clauses for top-level assignments (although unlikely), but others may use a simple vector of length equal to the number of total variables, which also covers non-top-level assignments conveniently. However, in Smart Repair, solvers need to take care of situations dealing with empty clauses or conflicting assignments due to the nature of Smart Repair. Modifying underlying data structures of such solvers to accommodate conflicting assignments would thus incur a lot of changes to the overall framework of the solvers. Luckily, instead, there is a solution that fits seamlessly into various embodiments of our existing Smart Repair framework. Consider the following example:

The problem is clearly UNSAT. A solver would first assign true to P, assuming that clauses are read in order. After that, how could a solver deal with the two unit clauses of (~P)? The solver can answer UNSAT at least, but for the next Smart Repair solving, it should somehow remember that (~P) is present. One may consider modifying the solver to store the unit clauses of (~P) as a special case, which would probably break the invariant that a solver does not store any unit clause. Nonetheless, assume at the moment that it does no special handling of (~P) and that the next Smart Repair solving requires removal of (X Y Z). This will make the solver return SAT, not knowing that (~P) still exists. One might argue that if it were storing the two unit clauses of (~P) in a special data structure, the solver would be able to answer UNSAT immediately, by scanning all the original clauses as well as the clauses in the special data structure.

(X Y Z)
(P)
(~P Q)
(~P ~Q R)
(~P ~Q ~R S)
(~P ~Q ~R ~S T)
(~P ~Q ~R ~S ~T U)
(~P ~Q ~R ~S ~T ~U)

This problem is also UNSAT. Note that for this input, a normal solver would end up having one clause (X Y Z) and true assignments to P, Q, R, S, T, and U. The questions then is, in Smart Repair, how should a solver handle the last conflicting clause? For the last clause, a normal solver would generally derive an empty clause after removing all the false literals. One could still insist that the solver store one of (~P), (~Q), (~R), (~S), (~T), and (~U) (they are all derivable; in fact, if UNSAT, literally every clause is derivable, e.g., (~X P ~T), etc.) in the special data structure, but which one exactly? If it stored (~R), then what happens if (~P T) is removed in the next Smart Repair solving? Note that in that case, the problem becomes SAT, and (~R) cannot be derived. Moreover, what if (~P Q) is removed? One may suggest another idea that the solver stores the last clause as-is without modification (which is obviously a very inefficient and inconsistent behavior) and have the solver scan all the original clauses at the beginning of each Smart Repair solving to find any conflicting clause.

All of the above complication arises from the attempt to store extra information on the solver-side, a kind of information that is not designed to be stored from the first place. Additionally, if it seemed complicated, it is because one failed to notice the presence of empty clauses; in the first example, two empty clauses could have been derived from (P) and (~P), and in the latter example, one empty clause from (P), (Q), (R), (S), (T), (U) and (~P ~T ~U). Remember that, after all, the purpose of the Smart Repair graph is to keep track of all derived clauses along with their antecedents, and it can surely include empty clauses. The vertices for the empty clauses are not special at all in that they represent clauses as usual, though empty, that are derivable by their corresponding antecedents; Master does not distinguish the vertices from other non-empty clauses at all.

Thus, for the purpose of Smart Repair, in various embodiments, the solvers notify Master to create a vertex for an empty clause whenever one is derived, which is what is already being done for all other non-empty clauses. No additional modification is required on the solver-side, except notifying the empty clauses with proper antecedents. Moreover, in this way, no scanning of clauses is necessary in subsequent solving iterations to ensure that the problem has not yet been proved UNSAT; it is sufficient for the Master to check whether there exists an empty clause in the graph. In fact, if Master keeps track of all incoming empty clauses, then at each solve request, Master can check if at least one empty clause exists in the entire graph and if it does, return an answer of UNSAT to Console immediately even without distributing clause data to solvers. In some embodiments, however, the Master is designed intentionally not to do any SAT-related computation but rather to act solely as a data distribution framework. In these embodiments, Master does not do any such early termination.

In some embodiments, R-Solve requires each solver to maintain a record of every empty clause that has ever been derived by that solver. Whenever an empty clause is derived, a vertex corresponding to the clause should to be created in the Smart Repair graph maintained by Master, in the same way other non-empty clauses are handled. In some embodiments, it is sufficient to have a simple list of IDs of the vertices. All the places and cases where a solver can return UNSAT are identified to make sure that the solver creates a vertex in the master graph for each empty clause and stores its ID in the list. If a solver returns or is able to return UNSAT at some point, it implies that an empty clause has already been derived.

Additionally, solvers typically have a global flag indicating if a problem is UNSAT, mostly for the purpose of early termination, but in Smart Repair, such a flag is not needed at all, as testing whether the list of empty clauses is empty or not can play the role of such a flag. Strictly speaking, if SAT or UNKNOWN at one point, the list must be empty (at least at that point), and if UNSAT, must not, and this invariant must hold throughout the entire lifetime of a solver.

The vertices for the empty clauses derived while adding or simplifying original clauses may have undo edges originating from them. For example, when given an original clause whose literals are all false under a current set of assignments, certainly an empty clause is derived from all the false literals and the clause itself, and a vertex which represents the empty clause will be created in the master graph. The solver does not need to add the conflicting clause, and in that case, an undo edge from the empty clause and the given original clause is added so that when any of the false literals are invalidated, the original clause can be added back. The two example inputs discussed earlier illustrate this case.

UNSAT While Adding/Removing Clauses or During Preprocessing. Normally, if at any point a conventional solver knew that a problem is UNSAT (in other words, when it derived an empty clause), it would exit immediately and return UNSAT no matter what it was doing. On the other hand, in Smart Repair, solvers must process and consume every clause handed over by Master, because if it simply stops accepting new clauses, they will be permanently lost. This also applies to new resolvents generated by eliminating a variable; a solver must "add" all resolvents.

In various embodiments, the solvers do not escape in the middle of initial preprocessing, which a conventional solver would do if UNSAT (preprocessing can sometimes take an enormous amount of time), for the sake of maximum processing of clauses for future solving iterations. As long as the Smart Repair keeps track of all the derived clauses including empty ones with correct antecedents and undo edges precisely, solvers can apply any kinds of simplification technique to any of its original clauses freely.

Fixing Internal Solver States: After solving an initial problem, subsequent addition or removal of clauses can leave a solver in a problematic state.

Broken Watchers: Below is an example that illustrates an issue, which is attributed to the 2-literal watching scheme.

A solver adds clauses in the order presented here. Suppose that when adding the fourth clause, the solver decided to watch ~R and ~S. When adding the last unit clause, a series of the following events will take place:

1. Assigns true to P.
2. Goes through the watch list of ~P. a. (~P Q) assigns true to Q and enqueues Q for future propagation. b. (~P R) enqueues R. c. (~P S) enqueues S.
3. Goes through the watch list of ~Q, which is empty.
4. Goes through the watch list of ~R, and sees that (~P ~S) is conflicting.

Eventually, the solver will stop running and report UNSAT. Now suppose that the solver starts another solving iteration after Smart Repair invalidates (~P Q). Note that Q is the only variable that will be made unassigned by the Smart Repair operation. When the solver enters the main DPLL loop, the first thing it may do is to pick the only unassigned variable Q as a decision variable and attempt assigning a value. It is possible that the solver assigns true to Q, which will certainly make (~P ~S) conflicting. However, since the solver is watching ~R and ~S only (i.e., the watch list of ~Q is empty) it will report SAT not knowing that the fourth report SAT not clause is conflicting.

Another example when SAT:
(~P Q)
(~Q R)
(~P S)
(~P ~Q R ~S)
(P)

Assume that a solver is watching R and for the fourth clause. The solver will correctly report SAT for an initial round of solving. Now suppose that Smart Repair invalidates (~P Q) and (~Q R), which will subsequently revoke the true assignments to Q and R. Similarly to the previous example, suppose further that the solver picks Q as a decision variable and assigns true to it. This should subsequently trigger unit propagation by the fourth clause that sets R to true in principle, but since the solver is watching R and ~S, the clause will not be visited by the assignment of Q.

All of the examples above suggest that, if any previous top-level assignments are revoked by Smart Repair, watchers of every clause including learnt clauses should be examined and repaired appropriately, before starting a new iteration of Smart Repair solving. Note that an attempt to repair watchers of a clause may reveal UNSAT or trigger unit propagation, as can be seen in the above examples.

The general principle of repairing watchers at decision level 0 is to watch any two unassigned literals in a clause, if the clause is not satisfied already. When satisfied, in some embodiments, for simplicity, the clause may be ignored and a simplification routine remove the clause later, which may create an undo edge if it is an original clause. If there is only one unassigned literal, it can trigger unit propagation, which can create a new vertex for the assignment in the Smart Repair graph. Note that the clause may become satisfied and can thus can be ignored. Additionally, the solver may want to share the new unit clause. Lastly, if all literals are assigned false, the solver has derived an empty clause and can add it to its own list of empty clauses after notifying Master to create a vertex for it.

Solving After UNSAT: Below is another example. Suppose that a solver reported UNSAT after having gone through the following sequence of events:

1. At some point, the solver learned that P is a fact (i.e., learned a unit clause), which should be asserted at decision level 0.

2. It backtracks to decision level 0, asserts P, and performs BCP.
3. BCP leads to a conflict, and (~P ~Q ~R) has been found to be a conflicting clause (i.e., P, Q, and R are asserted at decision level 0).
4. Since it is a conflict at decision level 0, the solver reports UNSAT.

Now suppose that the next iteration of Smart Repair solving removed some of the existing clauses but none of (P), (Q), (R), and (~P ~R). In other words, P, Q, and R are asserted as undeniable facts at decision level 0. It is obvious that the problem is still UNSAT. The issue is that, because P, Q, and R are already assigned, the solver can never have a chance to revisit (~P ~R) to conclude that it is UNSAT (clauses will never be visited if all of their literals are already assigned). Therefore, it is possible that the solver reports SAT if, for example, it succeeds to assign all other unassigned variables.

The issue can be resolved by maintaining a list of empty clause and checking if the list is empty at the beginning of each solving iteration, as described above. In summary:
1. Regardless of the last answer of SAT or UNSAT, if any assignments are revoked, in various embodiments, watchers of both original and learnt clauses, are adjusted, as described above.
2. Solvers maintain and check the list of empty clauses at the beginning of each solving iteration.

Smart Repair Graph Reduction

In various embodiments, the Smart Repair graph may grow indefinitely over the course of a long Smart Repair running. A method described below can alleviate the scalability problem that can drag down the execution of solvers, to the point of near suspension in some extreme cases. The limited scalability can be attributed to the centralized maintenance of the Smart Repair graph. Perceptually, the centralized graph can be considered an overlap or aggregation of separate graphs local to each solver.

Consecutive Elimination and Reinstitution of One or More Original Clauses

Either the normal Smart Repair operation or this graph reduction method requires general mark-and-sweep of the Smart Repair graph, and as such, may trigger restoring undo clauses, although for the latter operation, they should be restored lazily at the time the ground original clauses selected for temporary deactivation are reinstituted. In some embodiments, the normal Smart Repair operation, i.e., when a user or Console removes an original/ground clause and the reduction operation use the same channel for restoring undo clauses. Mark-and-sweep induced by either operation stack potential candidate clauses to restore in a unified data structure. The difference between them then is that while the normal Smart Repair operation restores all clauses stacked in the data structure immediately after marking, the graph reduction operation will simply stack new potential undo clauses.

Note that subsequent graph reduction operations by the Master may invalidate previously stacked undo clauses. Clauses invalidated at late times are not restored lazily. In one embodiment, two options govern the policy of selecting and initiating this reduction method. More options may be introduced and combined to enable a variety of sophisticated strategies.

The first option specifies a threshold memory size (e.g., in megabytes) for graph memory allocation to trigger reduction. The second option specifies a portion of active ground clauses to select as ground clauses per reduction. (e.g., 2%, 5%, 8%, 10%, etc.). Various embodiments ensure that no duplicate but only necessary clauses are sent to each solver when restoring undo clauses, although it is harmless to send the same clauses multiple times to a solver.

Lastly, various embodiments fully synchronizes the graph reduction operations with the clause sharing module, so that the module can maintain a correct state of valid clauses at all times. For this matter, Master sends information about lazy invalidation of clauses to the clause sharing module whenever a graph reduction operation takes place, in addition to the usual sending of information about invalid clauses by Smart Repair. Should the Master not send the information, the vertices for the clauses may be removed permanently after reduction, and the clause sharing module may not receive the information later that the clauses have been invalidated. However, it can be inefficient (but not incorrect) for the module to discard the clauses that are supposed to be invalidated lazily from its internal data structures right away, since the solvers will see the clauses alive until the next Smart Repair operation. Due to this lazy invalidation, in some embodiments, the clause sharing module employs a mechanism to invalidate the clauses in its internal data structures in a similarly lazy manner. As described herein, lazy manner means not until restarting solvers in the next iteration.

Example 1

C1: original clause C2: modified clause that resulted from C1 in a solver, has an undo edge to C1. C3: modified clause that resulted from C2 in the same solver, has an undo edge to C2.

Suppose that a graph reduction operation invalidates C3. It will stack C2 in the undo list for lazy restoration. If the next graph reduction operation happens to invalidate C2, the previously stacked C2 must be taken out from the undo list, and C1 will be stacked instead. If the next graph reduction operation selects C1 as one of ground clauses to start with, or if a subsequent reduction operation selects C1, C1 will nevertheless be restored because C1 is an original clause, which can be removed only if the user changes the CNF problem.

Example 2

There exist three solvers, Solver A, Solver B, and Solver C. C1: original clause C1-A: modified clause that resulted from C1 in Solver A, has an undo edge to C1 C1-B: modified clause that resulted from C1 in Solver B, has an undo edge to C1. Solver A and Solver B do not have C1 but instead C1-A and C1-B respectively in their original clause databases after modifying it.

Suppose that the first graph reduction operation invalidates C1-A and thus stacks C1 bound to Solver A in the undo list for lazy restoration. When initiating the next Smart Repair operation, this would send C1 to Solver A to add. Suppose further that, before the next Smart Repair operation, C1-B is invalidated in a similar manner and C1 bound to Solver B is stacked in the undo list. In this state, the next Smart Repair operation would send C1 to both Solver A and Solver B. Now if another graph reduction operation takes place and selects C1 as a ground clause before the next Smart Repair operation? C1 may be broadcast to all of the solvers, Solver A, Solver B, and Solver C, without duplicate messages in the next Smart Repair operation, i.e., without sending restore C1 to Solver A and Solver B.

Example 3

C1: original clause C1-1-A: modified clause that resulted from C1 in Solver A, has an undo edge to C1 C1-2-A:

another modified clause that resulted from C1 in Solver A, has an undo edge to C1. It is possible that a vertex has more than one undo edge coming from the same solver. Suppose that a graph reduction operation invalidates C1-1-A and stacks C1 in the undo list accordingly. In some implementations, any subsequent reduction operations that invalidate C1-2-A will not cause the next Smart Repair operation to send C1 twice to Solver A.

Parallel SAT Solving Framework

Introduction: In some embodiments, R-Solve is designed as a portfolio-based parallel SAT solver, and according to a high-level architecture. Solvers configured differently can run independently and compete with each other. Clauses deemed important, e.g., unit or binary, may be shared among solvers. The different solvers solving a specified CNF problem can be of the same type or can be of different types.

It is important to note that thereof this architecture for parallel SA¬T solving and the implementation are independent of Smart Repair. In various embodiments, Smart Repair and clause sharing can run in parallel, each having its own internal data structures and performing operations using them. For clause sharing, there is one dedicated module, in one embodiment. In general, the Master that performs Smart Repair is a different module and/or process from all of the solvers. The clause sharing module is also separate from all of the solvers and the solvers do not communicate with each other directly, in a peer-to-peer manner. The solvers communicate directly only with the Master/central controller and, optionally, with the sharing module.

Portfolio of Solvers: A preset number of solvers can be launched and configured differently according to the configuration options provided at the time of execution. No clever selection of particular types of solver based on the anatomy of input CNF may be done. Configuration may be static in the sense that it is independent of the input problem and may but need not change once configured. The number of solvers may or may not change either once an embodiment of R-Solve is initialized.

Examples

With reference to FIG. 5(A), an example master graph generated and maintained by Master/controller according to one embodiment includes vertices V1 and V2 and an undo edge from the vertex V2 to the vertex V1. The Vertex V1 can represent an original clause or a clause learned by a solver. The vertex V2 can also represent an original clause or a clause learned by that solver, though the clause of V2 is not learned from the clause of V1. As such, there is no antecedent or successor edge from V1 to V2. It should be understood that V1 and V2 can be only a portion of a vertex group corresponding to the solver in the master graph. In general, the master graph may include additional vertices and edges, including undo edges, in the vertex group corresponding to the solver. In addition, the master graph may include additional vertices and edges corresponding to other solvers in the ensemble.

With reference to FIG. 5(B), in some embodiments, the vertex V2 is a dummy vertex, i.e., no clause (and no empty clause) is associated with the vertex V2. An antecedent/successor edge is purposefully provided from a vertex V3 to the vertex V2, where the clause of V3 is not derived from the clause of V1 and, hence, there is no antecedent edge from V1 to V3. Nevertheless, the solver has determined that if the clause of V3 is true, the clause of V1 is true, as well, and, hence, locally invalidated the clause of V1. For example, the clause of V3 may subsume the clause of V1 or satisfies the clause of V. If the clause of V3 is invalidated, V3 is marked for removal. Because V2 is reachable from V3 (via the antecedent edge therebetween), V2 is marked for removal, as well. The undo edge from V2 to V1, can then trigger restoration of V1, if V1 is not independently marked for removal. In this way, should the clause of V3 that was learned by the solver become invalid, the solver can use the clause of V1.

In solving some CNF problems, there can be an undo edge from V1 to another vertex V4, as shown in FIG. 5(C). The chain of undo edges can continue from V4 through additional vertices, e.g., (1, 2, 3, 5, 10, 18, etc.) additional vertices. In various embodiments, the Master/controller navigates through the chain of undo edges, e.g., from V2 to V1, to V4, etc., until an unmarked vertex is encountered. The clause of the first encountered unmarked vertex may then be restored in the corresponding solver, as described above.

With reference to FIG. 5(D), the clause of vertex V2 was derived from the clause of vertex V1 and, hence, there is an antecedent edge from V1 to V2. The solver decided to remove V1 and, hence, there is an undo edge from V2 to V1 in the master graph. Either one or both of vertices V1 and V2 can correspond to original clauses or learnt clauses. With reference to FIG. 5(E), the clause of V1 was learned from an original clause corresponding to vertex VOL. The clause of V2 was also learned from another original clause corresponding to vertex VO2. During Smart Repair and/or graph reduction, Master/controller invalidated VO2. (If this is due to graph reduction, the clause of VO2 is invalidated only temporarily and is reinstituted after learnt clauses corresponding to vertices reachable from VO2 are removed.) As such, Master/controller removes V2 and notifies the solver to remove the clause of V2. The removal of V2, however, can trigger the restoration of the clause of V1. This is because the solver had removed that clause when it derived the clause of V2 and, because V1 is not reachable from VO2, V1 is not marked for removal. The solver can now use the restored clause of V1, even though, the clause of V2 is removed.

With reference to FIG. 5(F), Solver 1 learned clause C1 from the original clause corresponding to the vertex VO1, and assigned a unique identifier ID_S1-C1 thereto. Solver 1 further learned clause C2 from clause C1 and assigned a unique identifier ID_S1-C2 thereto. Moreover, Solver 1 removed clause C1. Accordingly, the master graph includes vertices VO1 and VO2 corresponding to the original clauses and a Vertex Group 1 associated with Solver 1, which includes vertices V1 and V2. Because clause C1 was removed, there is an undo edge from V2 to V1 in the master graph.

Solver 2 learned clause C5 from the original clause corresponding to the vertex VO1, and assigned a unique identifier ID_S2-C5 thereto. Solver 2 also learned clause C2, but from clause C5, and assigned a unique identifier ID_S2-C2 thereto. Solver 2 did not remove clause C5. Accordingly, the master graph includes a Vertex Group 2 associated with Solver 2, which includes vertices V5 and V6. Because clause C5 was not removed, there is no undo edge from V6 (which corresponds to clause C2, as well) to V5 in the master graph. If VO2 is removed (temporarily in graph reduction or due to a change in the problem to be solved), clause of V2 (i.e., clause C2) would be removed from Solver 1 and the clause of V1 (i.e., C1) would be restored. Clause of V6 (which is C2, as well) will be removed from Solver 2. Because C5 was not removed, it need not be restored and the master would not inform Solver 2 to restore the clause C5.

In various embodiments described herein, the Master/controller knows not only about any changes to an original or a previously attempted problem but also knows, via one or more undo edges and marking of the corresponding vertices, about clauses that were learned previously and are still valid. Therefore, the Master/controller can provide this information to the individual solvers, allowing them to restore certain useful clauses after the problem to be solved has changed, which can increase the performance of the ensemble.

Clause Sharing Overview:

Typically, though not necessarily, only very important, mostly unit and binary, clauses may be shared, and solvers seldom remove them. One mode of clause sharing can be described roughly as attempting to maintain the entire solvers synchronized to the point that every solver has exactly the same set of shared clauses gathered so far since the start of clause sharing. However, note that solvers have the liberty to discard any of their learnt clauses, including shared ones, at any time. Master will respect such decisions of individual solvers, so this can result in a discrepancy in the synchronization. In various implementations, Master may not even be aware of this kind of solver-side removal of shared clauses; once a clause was sent to a solver, Master will not send the same clause again to that solver (unless the RID of that particular clause is invalidated explicitly and there remains another RID for the same clause in the system), assuming that the clause will remain there indefinitely until it is explicitly invalidated by Smart Repair. This implies that, for example, if a shared clause is removed after it became satisfied at some point in a solver, the solver may not have a chance to recover the clause again even if it becomes unsatisfied in the next iterations of Smart Repair solving.

In some embodiments, clauses are not shared during initial preprocessing. This can be beneficial if all solvers in the ensemble are of the same kind and, hence, there may be little variation from solver to solver in the preprocessing step. With many different kinds of solvers, clauses may or may not be shared during the preprocessing stage.

If a solver learns a clause (including a unit clause) that seems worth sharing, it can call a suitable function or API method for informing the sharing module. Optionally, the solver can also provide a score of significance of the clause by a parameter. Not to flood the communication messages, the clauses to be shared may be buffered like in the case of normal learnt clauses, but using a separate buffer. The buffer for the clauses to be shared may be flushed at the same time when the buffered learnt clauses are flushed to Master. Because the learnt buffer is generally flushed when the number of learnt clauses reaches a specified limit, the buffer for the shared clauses need not be explicitly limited. However, in some embodiments a limit is placed on the shared clause buffer and the shared clause buffer is flushed, after flushing the learnt clause buffer, whenever the limit is reached. This can be effective in situations where it takes some time to generate important clauses to share. In other embodiments, different strategies can be combined as to when to flush, for example, flushing after a certain number of conflicts, etc.

It is anticipated that due to the buffering, there is a fair chance of getting same clauses from many solvers, but with different RIDs. For this reason, in some embodiments of R-Solve, we check for duplicate clauses on the Master-side. A significant portion of the complexity of the clause sharing module can be attributed to the data structures and routines to support checking duplicate clauses. As such, some embodiments do not check for duplicate clauses, in favor of less complexity (and less overhead, though it is negligible). These embodiments can be efficient when only a limited set of clauses can be shared. For example, if solvers are limited to share only unit and binary clauses, the solvers may have a limited number of duplicate binary clauses, at most. Moreover, in some embodiments, solvers themselves can check for duplicate binary clauses if they really want to, as the overhead of checking is not significant.

When Master receives clauses from solvers, Master simply puts received clauses into a worklist queue, like the buffering on the solver-side, until it believes that an enough number of entirely new clauses to be shared have been stacked to initiate broadcast sharing. The threshold can be 30, 50, 100, 150, etc. In some embodiments, receiving an already existing clause does not count as a new clause. When the threshold is reached, Master goes through the worklist to send each clause in the list to the solvers that do not seem to have it presently. To this end, Master keeps track of which solver sent which clauses and which clauses have been sent to which solvers; Master may selectively send clauses to each solver. However, due to concurrency and buffering, Master can actually send a clause to a solver that already has it.

Example 1: Solver A, Solver B, and Solver C learn a binary clause (P Q) at the same time, with RID's of ID_A, ID_B, and ID_C, respectively. All the solvers attempt to share the clause. Master receives ID_A and ID_B, but ID_C has not arrived yet (due to buffering or concurrency). This counts as receiving one new clause, and Master keeps the record indefinitely that Solver A has ID_A and Solver B has ID_B, regardless of the possibility that the solvers can drop the clause locally. Assume that the threshold for initiating clause sharing has been met, and Master picks an arbitrary RID, say ID_A, to share the binary clause with Solver C. If Solver C does not check duplicates, it will end up having two instances of (P Q), each with RID ID_A and ID_C respectively.

Nevertheless, Master will record that Solver C has ID_A after sending out the clause, again regardless of an actual existence of ID_A in Solver C. Then, Master finally receives ID_C. In this case, the current implementation overwrites the existing record, stating that Solver C has ID_C instead of ID_A because the Master checks for duplicates and determines that the clause associated with ID_A and ID_C is the same clause. Master buffers a message to be sent to Solver C in the next Smart Repair solving that ID_A is invalid. It is important to send the message that ID_A is invalid in Solver C in the next iteration, because otherwise, ID_A can survive wrongly in Solver C in the case where ID_A becomes actually invalidated. It should be noted that invalidating a clause ID does not necessarily imply invalidating the associated clause itself. Master may synchronize clauses already shared in the past, if some of the solvers lose the clauses while others don't.

Example 2: Continuing from the Example 1, suppose that the clause associated with ID_A was invalidated by Smart Repair, but luckily, the clauses associated with ID_B and ID_C survived. Solver A removes its own (P Q) accordingly. Likewise, Master also removes ID_A from its record, and knowing that Solver A will remove the clause in the end, it puts the clause (P Q) to the worklist for sharing. Later, at the time of sharing, Master will pick an arbitrary RID, say ID_B, and send it to Solver A. In the following example, Solver B loses (P Q) and cannot recover it.

Example 3: Continuing from the Example 1, Solver B learns a unit clause (P) and later discards (P Q) locally during simplification (no undo edge for learnt clauses). Master will be unaware of this event. Suppose that the unit clause (P) from Solver B has been invalidated in a subsequent Smart Repair solving, while all of ID_A, ID_B, and ID_C remain valid. However, Solver B cannot recover (P Q) in this situation, as Master believes that Solver B has ID_B.

Various embodiments properly remove clauses spread across the system if they are invalidated by Smart Repair. If it were not for clause sharing, the entire Smart Repair graph could be decomposed into separate graphs perfectly local to each of all the solvers in the system, and every vertex except ground ones would belong to exactly one solver. Various embodiments perform clause sharing, however, that can spread clauses across other solvers. Therefore, in various embodiments the clause sharing module manages the irregularity it created, ensuring that if a clause shared and sent to other solvers is invalidated, the clause gets eliminated system-wide.

Example 4: Continuing from the Example 2, after ID_B is sent to Solver A, suppose that Smart Repair invalidated ID_B. Smart Repair will send, at some time, a message to Solver B to remove the clause. The clause sharing module will also be told that ID_B is invalid now, and by looking at the record, it realizes that ID_B has been sent to Solver A. The module will prepare a message to be send to Solver A to remove ID_B.

In various embodiments, a clause sharing module can perform all the tasks described above. The clause sharing module and the Smart Repair module may be included in the Master. The clause share module is mostly independent of Smart Repair; it only needs to be told which RIDs are invalidated by Smart Repair. Instead, an unordered hash map from C++ 11 STL, a map from 3rd party libraries, or a custom-made map could be used if desired. The mapping of clauses represented by the Master and the individual solvers, as described above, can be implemented using hashing functions, including unordered hash maps. Checking for duplicate clauses by the Master/sharing module can also be implemented using a hashtag function. A vector, an ordered map, and/or a multi-level map can be used to keep track of clauses shared across various solvers.

In one embodiment, the key of the map is a clause, and the ultimate value accessed by a key can be thought of as the current sharing state of the clause in the system. A clause as a key requires that it is sorted, is not trivially true, and does not contain duplicate literals. The first level of hash is the number of literals in a class. The next level of hash is a 16-bit value computed from the literals in a clause by a hash function. Next, instead of a map, the next level is a Bucket, which is a list of Entries for clauses that have the same hash value. Therefore, to locate the Entry for a given clause, this particular implementation iterates over the list. Each Entry contains the information of which solvers have the corresponding clause with which RID. For this, an Entry creates an array of static size equal to the number of MPI processes, to store RIDs of the clause. For example, if the i'th element of the array is a non-null RID, it indicates that, to the best of Master's knowledge, the solver of rank i has the clause. Note that the size of the array is static, and a null RID indicates non-existence of the clause in the solver corresponding to the index of the array.

Although the central map stores all necessary information about clause sharing, another data structure called ID_MAP is employed for quick access to an Entry that holds a given RID as well as the number of occurrences of the RID in the entry. Given an RID, it will return a Guide structure that has a pointer to an Entry for the clause identified by the RID. The ID_MAP structure is synchronized with the central data map, so if an RID exists in an Entry, ID_MAP can return a pointer to the Entry and vice versa. The Guide structure also keeps track of the number of solvers that have the corresponding RID (the number of occurrences of this RID in the Entry.).

Level of Sharing

In some implementations, options are provided regarding clause sharing. The first option determines the level of sharing:

0=no sharing
1=unit learnts
2=unit and binary learnts
3=on top of 2, randomly chosen learnts
4=all learnts.

The second option controls the probability with which new clauses are chosen randomly for sharing and is in effect only when the first option is set to 3 or 4.

Integrating Solvers

Adding Shared Clauses:

In various embodiments, Master intermittently sends out clauses to be shared, and solvers therefore need to check periodically for the arrival of new shared clauses inside a DPLL loop. In addition, solvers are also expected to check for the message in the main loop for polling Master commands.

Like in the case of adding new original clauses, in various embodiments, solvers bring themselves to decision level 0 whenever a new message arrives. However, unlike adding original clauses, they will generally save the current decisions to prevent too frequent restarts, since it is possible that messages can be flooded if the level of sharing is high, particularly when there are many solvers.

Solvers have liberty to add or ignore shared clauses, but Master assumes that solvers always added shared clauses. Solvers do consume and dispose, however, every MPI message.

The general steps to add shared clauses inside a DPLL loop include:
1. Checks periodically arrival of shared clauses via a suitable API function.
2. If clauses are pending, backtrack to decision level 0. Solvers may save current decisions should they want to restore them after adding the clauses.
3. Retrieve the shared clauses via a suitable API function.
4. Moderate the clauses (if variable elimination is performed).
5. Add the shared clauses properly (as explained below).
6. Repeat steps 3-5 until there are no more pending clauses.
7. Restore the decisions saved at the step 2.

Adding shared clauses in step 5 is largely different from adding original clauses in that shared clauses are redundant.

In general, shared clauses from Master will neither be trivially true nor have duplicate literals, so solvers do not need to check for these conditions. It is also possible that, e.g., due to concurrency, Master sends clauses that solvers already have. In various embodiments, solvers do not modify the shared clauses at all, as it may increase overall complexity by having to create another vertex in the Smart Repair graph, and because only important clauses are shared, and they generally are small clauses.

If a clause is already satisfied (or useless for another reasons), solvers may decide to silently ignore and discard the clause. In fact, shared clauses can be discarded at any time like other learnt clauses. However, solvers do not notify the Master of the removal as RIDs from other solvers (i.e., from solvers that did not learn the clause) are ignored.

Solvers may attach watchers to two unassigned literals, including unit clauses (i.e., assignments). If all literals are assigned (and false), solvers may create and store an empty clause locally and notify Master. Solvers may not escape and process every clause of the rest of the classes to be shared, like in the case of adding original clauses. If only one literal is unassigned, solvers may propagate, which can lead to a conflict. Otherwise, solvers may register the shared clause in the learnt clause database.

Finally, as stated earlier, shared clauses can arrive even after a solver came to a complete stop and is resting at decision level 0. These clauses are to be consumed too, but not by using the above process, because it can lead to consuming MPI messages out of order. For example, clauses that were supposed to be integrated after a start of solving might end up being integrated before the start. Solvers may process all MPI messages in the order of their arrivals in the main MPI message polling loop, as depicted in FIG. 6.

Sharing Clauses

Solvers can share clause by invoking an API function. In various embodiments, solvers ensure that a clause to be shared does not have duplicate literals, because Master may expect this condition to be true. In some embodiments, Master can check for duplicate literals, so the solvers need not check for the condition. Removing duplicate literals can be done at any adequate places if required, including in the Clause Sharing module.

Examples

Figure 7A:
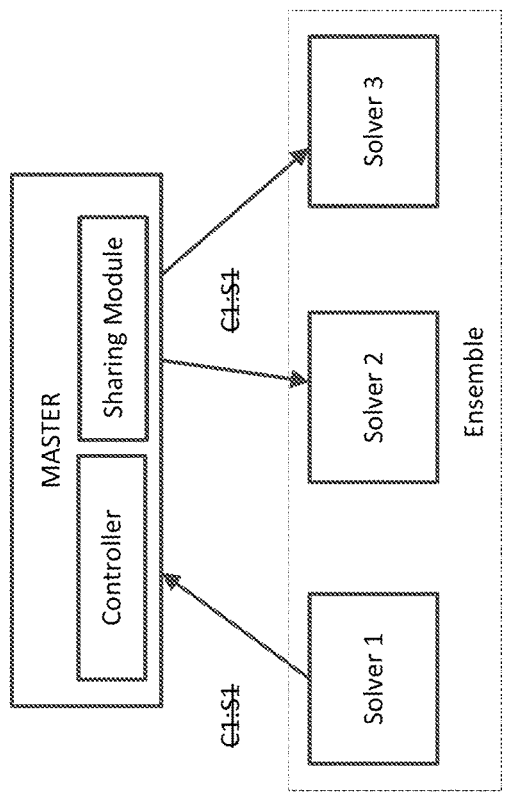
FIGS. 7(A)-7(E) schematically depict communications between solvers and a sharing module, according to various embodiments.

With reference to FIG. 7(A), an example system includes a sharing module and three solvers. It should be understood that the number of solvers is illustrative and can be any number in general (e.g., 1, 2, 5, 8, 29, 32, 40, 63, 128, 200, etc.). In operation, Solver 1 learns a clause C1 and assigns a unique ID S1 thereto. Solver 1 notifies the controller included in the Master of the learnt clause C1:S1. In addition, Solver 1 determines that clause C1 is sharable and notifies Master of that decision. The sharing module in the Master subsequently determines that C1 is sharable. Master/controller inform the sharing module that Solver 2 and Solver 3 have not leaned clause C1 (e.g., because they did not send messages to Master/controller that they learned the clause C1 or, at least, the Master has not yet received such messages e.g., due to buffering and concurrency). The sharing module also determines that the clause C1 was not previously shared with the Solvers 2 and 3. Therefore, the sharing module sends messages to Solver 2 and Solver 3 to add new clause C1:S1, and updates a database maintained by the sharing module, now indicating that clause C1:S1 was shared with Solver 2 and Solver 3.

Figure 7B:
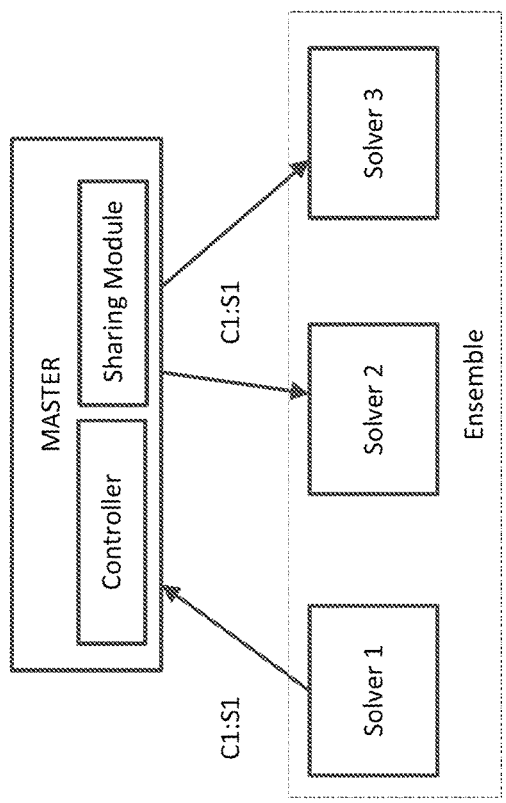

Subsequently, the clause C1 may be invalidated, e.g., explicitly by a user during an incremental change to the problem to be solved, or during graph reduction by Master/controller. In that case, Master/controller can inform the sharing module, which can send messages to Solver 2 and Solver 3 that the clause C1:S1 is invalid, as depicted in FIG. 7(B). If Solver 1 invalidates C1, then also the sharing module can inform Solvers 2 and 3 that C1 is now invalidated.

Figure 7C:
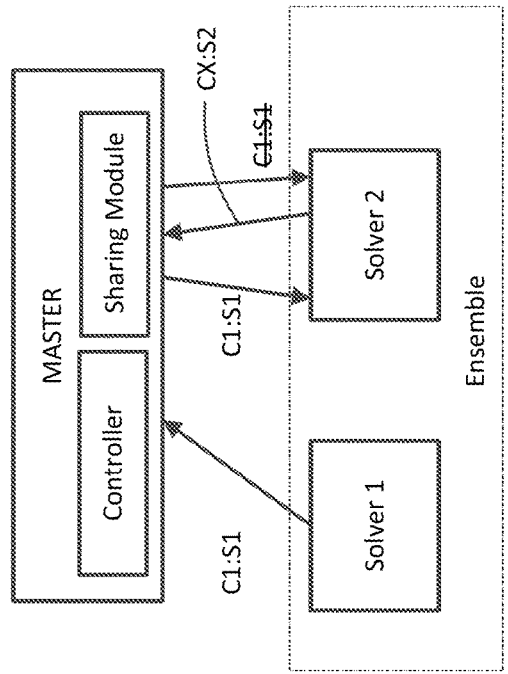

With reference to FIG. 7(C), the sharing module learns that Solver 1 has determined that clause C1:S1 is sharable and, as described above, the sharing module further determines that clause C1:S1 meets the sharing module's requirements for sharing clauses, and that the clause C1:S1 should be shared with Solver 2. After sharing the clause with Solver 2, as described above, the sharing module is informed (e.g., via Master/controller) that Solver 2 has learned a new clause CX, to which Solver 2 designated a unique identifier S2.

The Master or the sharing module may determine that the clause CX is actually the same as clause C1. This can be done by checking for duplicate clauses, as described above. Therefore, the Master/controller and sharing module update their database to indicate that Solver 2 has learnt clause C1 associated with ID S2. The sharing module then sends a message to Solver 2 that the association of ID S1 with clause C1 is now invalid. Note, this message does not inform Solver 2 that the clause C1 itself is invalid.

If Master or the sharing module determine that clause CX is a different clause, e.g., a clause C2 different from clause C1, the sharing module may first determine whether the clause C2 meets the sharability requirements of the sharing module. If such requirements are met, the sharing module may further determine whether the clause C2 should be shared with Solver 1 and, if so, may send a message to Solver 2 in a similar manner as described above. The operations performed by the Master/controller and the sharing module with respect to Solver 3 are omitted in the discussion of FIG. 7(C) for the sake of simplicity only. In general, such analyses are performed for each of the solvers in the ensemble.

Figure 7D:
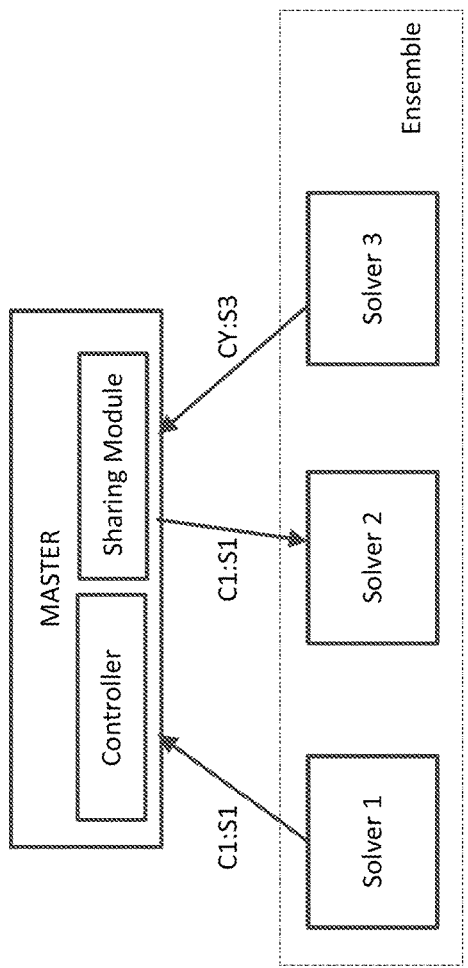

With reference to FIG. 7(D), the sharing module is notified by Solver 1 that a clause C1 (having ID S1) is to be shared. Solver 3 notifies the sharing module that a clause CY (having ID S3) is to be shared. The sharing module determines that the clause CY is a duplicate of the clause C1 and further determines to share clause C1 with ID S1 with Solver 2, as described above. Alternatively, the sharing module may share clause CY (i.e., Clause C1) with ID S3 with the Solver S2, instead of sharing clause C1 with ID S1.

Figure 7E:
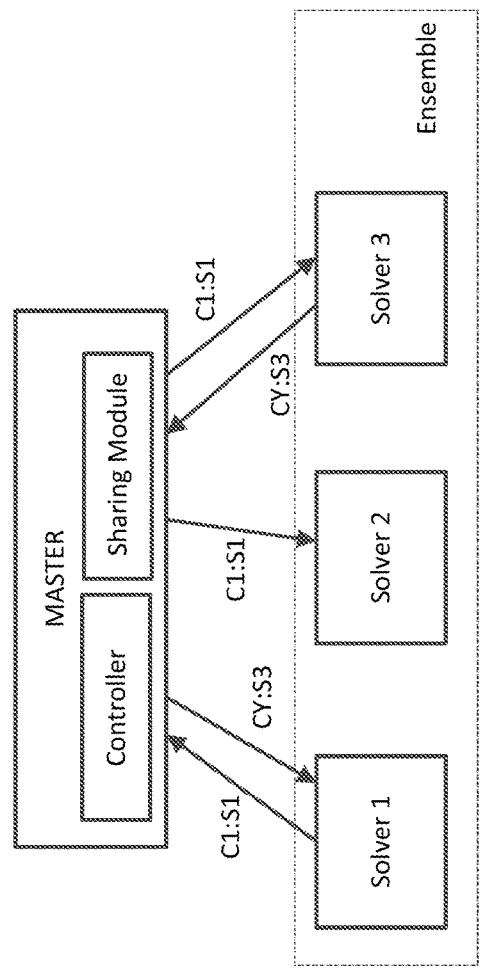

With reference to FIG. 7(E), the sharing module determines that the clause CY is not a duplicate of the clause CL. The sharing module also learns from the controller that the Solver 2 has previously learned clause CY. Therefore, the sharing module shares clause CY:S3 with Solver 1 and clause C1:S1 with Solver 2 and Solver 3, as well.

In various embodiments described herein, the individual solvers do not share clauses with each other in a peer-to-peer manner and a central sharing module may determine which clauses are to be shared. This allows the central sharing module to maintain up to date information about which clauses are shared with which solvers. This information allows the central sharing module to provide relevant updates to each solver as a solver, a graph reduction operation, and/or a change to the problem being solved invalidates one or more clauses shared across the ensemble. Moreover, the Master/controller can provide relevant updates to the respective solvers about clauses that can be restored if a shared clause is invalidated.

Results

In some embodiments, R-Solve uses the Salt language and translation tool for generating CNF problem instances from high-level constraints. The Salt language provides about 120 operators supporting logical, bit set and fixed-point arithmetic expressions. The Salt compiler tunes the output CNF for search-efficiency and has optimizations specifically targeted at accelerating the processing of arithmetic expressions. One version of Salt is a static, single-pass tool, but supports the generation of labeled constraint blocks that can be independently activated or deactivated by an R-Solve console script.

Many modern SAT solvers are adept at solving problems spanning logical and arithmetic constraints. As reference points, Glucose can solve a hard (for humans) Sudoku puzzle in ~5-10 ms of CPU time. Rendered from Salt, Glucose can typically recover the integer roots of a randomly generated 6th-degree polynomial with 32-bit integer coefficients in 500-2000 ms of CPU time. Reducing to cubic polynomials with 16-bit coefficients, the CPU time drops to 10-30 ms. Many 64-bit problems, however, are intractable. SAT is not necessarily the best method for finding roots and in framing many problems it is advantageous to minimize the impact of arithmetic constraints. However, these reference points have value in that they ground expectations and show that SAT can solve both logical and non-linear arithmetic constraints in a common framework.

For testing, we used a generic resource allocation multi-objective optimization problem framework rendered through Salt in which one or more among a heterogeneous set of assets must be applied to address each of a set of distinct tasks. Asset application is according to rules—some specific to the nature of the asset, some to the nature of the task and some universal. The rules simulate complex coordination, deconfliction, and mutual-exclusion constraints. Further, a fitness function can be defined that includes components for tasks achieved or not achieved, assets used or not used, specific costs for applying a particular asset to a particular task (e.g., simulating proximity or suitability of the asset to the task) and a global component derived from the complete solution. The global component allows modeling of such considerations as the quality of the distribution of unused assets or unaccomplished tasks—it is a function that may not be piecewise computable, can involve non-linear terms such as sum-of-squares, and has meaning only in the context of the complete solution. The framework allows optimization of the fitness function and also rule modification (e.g., elimination of an asset, addition or a new task, new rules for accomplishing a task, etc.)

Because of the static nature of Salt, our testing requires the pre-generation of all potentially necessary labeled constraint blocks followed by scripting that simulates what would otherwise be an automatic process of activating or deactivating the clause blocks to drive to a solution. As an illustrative example, we simulated an optimization problem involving twelve (12) tasks and twenty-seven (27) assets split into two kinds with two classes in each kind where one of each kind was necessary to complete each task. All tasks had to be completed and each asset could only be assigned to at most one task. Each asset used included a fixed cost plus a compatibility cost based on proximity to the task (different for each task). A global function assigned higher fitness to solutions that maintained a better balance between unused classes of asset within each kind. The fitness function was computed using 16-bit arithmetic (Salt supports any choice of bit precision so the precision can be fit to the problem). The formulation took advantage of opportunities to reduce arithmetic constraints to easier logical constraints (e.g., a maximum Euclidean distance constraint could be reduced to a logical constraint prohibiting asset-task matches that would be out of range). The goal was to find a provably optimal solution.

The problem required sixteen (16) iterations of Smart Repair to converge on an optimal fitness value. The problem consisted of 22,430 variables with ~97,000 clauses active at any one time (~90,000 common to all instances). Running Glucose individually on the sixteen (16) required problem instances required 19.7 s of total CPU time. With Smart Repair, the total CPU time to converge on the optimal solution was reduced to 3.1 s (an 84% reduction). Subtracting out the time to the first solution (0.96 s) common to both methods, Smart Repair completed the remaining fifteen (15) iterations 89% faster than the Glucose method (restart at each fitness level).

For a single-solver ensemble, the Smart Repair graph reached 220,053 nodes. For a four (4)-node solver the graph increased to 652,093 nodes. One embodiment supports up to sixty-three (63) solvers. In testing, clause generation rates were highly variable, but the master process was able to service up to sixteen (16) solvers consistently for problems that can be solved in a few minutes, and more solvers in many cases.

The remarkable progress in effective SAT solving over the past two decades has been driven, in large part, by annual competitions that measure speed at solving a range of both structured and unstructured (random) problems. Quantifiable progress on a range of problems has been an enormous driver of innovation in the academic SAT community. However, if there is a criticism against competitive solving, it is that its focus is too narrow—performance is only measured on problems that have been pre-rendered to CNF. To the extent that solvers try to preprocess problem instances for better performance, the effort is generally spent applying pattern-driven syntactic transforms that, at best, rediscover (often at considerable cost) the lost underlying substructure of the root problem being solved. It is our belief that the largest unexplored territory of future progress in practical SAT solving is in expanding consideration of the problem beyond the narrow limits of the CNF representation. In various embodiments, R-Solve provides a platform for that exploration.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A processor-implemented method for controlling an ensemble of a plurality of processor-implemented solvers, the method comprising performing by a controller the steps of:
   receiving, from a user, an instruction indicating invalidation or removal of one or more original clauses from a set of original clauses defining a first problem to be solved by the ensemble of the plurality of processor-implemented solvers, wherein a modified set of original clauses, derived by the invalidation or removal of the one or more original clauses, defines a second, different problem to be solved by the ensemble;
   generating, by a controller, a master graph comprising an aggregation of local graphs, each local graph being separate from other local graphs and corresponding to one of the plurality of solvers by:
     creating a first vertex corresponding to a first clause, and associating the first vertex with a first solver of the plurality of solvers;
     adding a second vertex corresponding to a second clause, and associating the second vertex with the first solver; and
     establishing an undo edge from the second vertex to the first vertex;
   identifying, by the controller, using the second vertex and the undo edge, a vertex corresponding to a clause to be restored; and
   transmitting, by the controller, a command to the first solver comprising a signal to restore the clause to be restored.

2. The method of claim 1, wherein the command further comprises a signal to invalidate the second clause.

3. The method of claim 1, wherein the controller transmits the command while the first solver is running.

4. The method of claim 1, wherein the controller transmits the command when the first solver has stopped running, before the first solver starts running again.

5. The method of claim 1, wherein:
   the vertex corresponding to the clause to be restored comprises the first vertex; and
   the clause to be restored comprises the first clause.

6. The method of claim 1, wherein the second clause is a dummy clause, the method further comprising:
   receiving from the first solver, prior to adding the second vertex, a message describing: (i) that the first solver identified a third clause, (ii) a relationship between the first clause and the third clause, and (ii) that the first solver removed the first clause from a data structure maintained by the first solver;

adding a third vertex corresponding to the third clause, and associating the third vertex with the first solver; and forming a successor edge from the third vertex to the second vertex.

7. The method of claim 1, wherein:
identifying the vertex corresponding to the clause to be restored comprises:
(i) identifying, using the undo edge, the first vertex; and
(ii) identifying, using an undo edge from the first vertex, a fourth vertex that corresponds to a fourth clause and is associated with the first solver; and
the clause to be restored comprises the fourth clause.

8. The method of claim 1, further comprising:
receiving from the first solver, prior to adding the second vertex, a first message:
(i) describing that the first solver at least in part learned the second clause from the first clause and removed the first clause from a data structure maintained by the first solver; and
(ii) identifying a first unique identifier associating the second clause described in the first message with the first solver; and
forming a successor edge from the first vertex to the second vertex.

9. The method of claim 1, wherein the controller is separate from each one of the plurality of solvers.

10. The method of claim 1, in which the transmitting is triggered by the identifying of the vertex corresponding to the clause to be restored.

11. A processor-implemented method for controlling an ensemble of a plurality of processor-implemented solvers, the method comprising performing by a controller the steps of:
receiving, from a user, an instruction indicating invalidation or removal of one or more original clauses from a set of original clauses defining a first problem to be solved by the ensemble, wherein a modified set of original clauses, derived by the invalidation or removal of the one or more original clauses, defines a second, different problem to be solved by the ensemble;
pruning, by the controller, a master graph comprising an aggregation of local graphs, each local graph being separate from other local graphs and corresponding to one of the plurality of solvers, the master graph including:
a plurality of original vertices, each original vertex corresponding to a respective original clause; and
a plurality of vertex groups, each vertex group being associated with a respective solver from the plurality of solvers;
generating, by the controller, a plurality of pruning messages, each pruning message corresponding to a respective one of the plurality of solvers; and
transmitting, by the controller, to each one of the plurality of solvers, the corresponding pruning message.

12. The method of claim 11, wherein each vertex group comprises:
a plurality of non-original vertices, each non-original vertex: (i) corresponding to a respective clause learned by a solver associated with the vertex group, and (ii) being reachable from at least one of the original vertices.

13. The method of claim 12, wherein pruning the master graph comprises:
selecting one or more original clauses;
identifying one or more original vertices corresponding to the selected one or more original clauses;
within each vertex group:
marking all non-original vertices that are reachable from the one or more identified original vertices;
collecting identifiers of learned clauses corresponding to the marked non-original vertices; and
removing the marked non-original vertices.

14. The method of claim 13, wherein generating a pruning message corresponding to a particular solver comprises:
selecting the vertex group corresponding to the particular solver; and
listing in the pruning message the collected identifiers of the learned clauses as identifiers of clauses to be removed.

15. The method of claim 14, wherein a particular vertex group comprises an undo edge originating from a first non-original vertex, and the method further comprises:
identifying a destination vertex that is reachable via the undo edge and that is not marked; and
listing in the pruning message a learned clause associated with the destination vertex as a clause to be restored.

16. The method of claim 15, wherein:
the undo edge originating from the first non-original vertex terminates at a second vertex; and
the destination vertex comprises the second vertex.

17. The method of claim 15, wherein:
the undo edge originating from the first non-original vertex terminates at a second vertex;
another undo edge originating from the second vertex terminates at a third vertex; and the destination vertex is reachable from the third vertex.

18. The method of claim 13, wherein selecting the one or more original clauses comprises a random selection.

19. The method of claim 13, wherein selecting the one or more original clauses comprises a score-based selection, the method further comprising:
computing a score for each original clause using at least one of: number of literals in the clause, and number of vertices reachable from a vertex corresponding to the original clause.

20. The method of claim 11, further comprising, prior to transmitting the pruning messages, determining that the ensemble has stopped, wherein the pruning message corresponding to each solver is transmitted prior to restart of the ensemble.

21. The method of claim 11, wherein the controller is separate from each one of the plurality of solvers.

* * * * *